United States Patent
Negishi et al.

(10) Patent No.: US 6,694,251 B2
(45) Date of Patent: Feb. 17, 2004

(54) INFORMATION PROCESSING APPARATUS AND METHOD, RECORDING MEDIUM, AND PROGRAM

(75) Inventors: Shinji Negishi, Kanagawa (JP); Kazunori Yasuda, Kanagawa (JP); Yoichi Yagasaki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/196,624

(22) Filed: Jul. 17, 2002

(65) Prior Publication Data

US 2003/0074130 A1 Apr. 17, 2003

(30) Foreign Application Priority Data

Jul. 30, 2001 (JP) ..................... P2001-230350

(51) Int. Cl.[7] ............ G06F 17/00; G01C 21/32
(52) U.S. Cl. ............... 701/200; 701/201; 701/211; 340/937; 382/104; 348/143
(58) Field of Search ................. 701/200, 201, 701/209, 210, 211; 340/993, 937, 995.17, 995.19, 995.23, 995.27; 348/118, 142, 143; 382/104, 105, 106, 107; 707/10, 530

(56) References Cited

U.S. PATENT DOCUMENTS 6,573,929 B1 * 6/2003 Glier et al. ............ 348/149

FOREIGN PATENT DOCUMENTS

JP 2000-032374 1/2000

* cited by examiner

*Primary Examiner*—Tan Q. Nguyen
(74) *Attorney, Agent, or Firm*—Rader, Fishman & Grauer PLLC; Ronald P. Kananen

(57) ABSTRACT

The present invention relates to an information processing apparatus including: moving image data storing means for storing moving image data; degree of importance setting means for setting the degree of importance of the moving image data; thinning-out means for thinning out the moving image data on the basis of the degree of importance and, thereby, generating thinned-out data; and transmitting means for transmitting the thinned-out data to another information processing apparatus.

29 Claims, 32 Drawing Sheets

F I G. 1
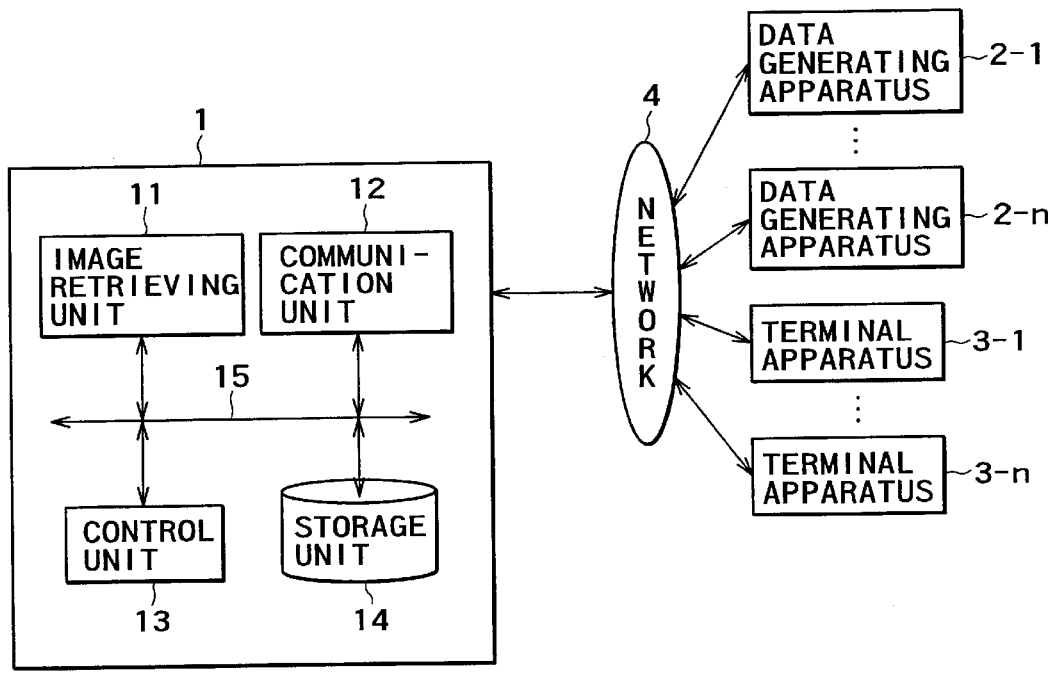

F I G. 3
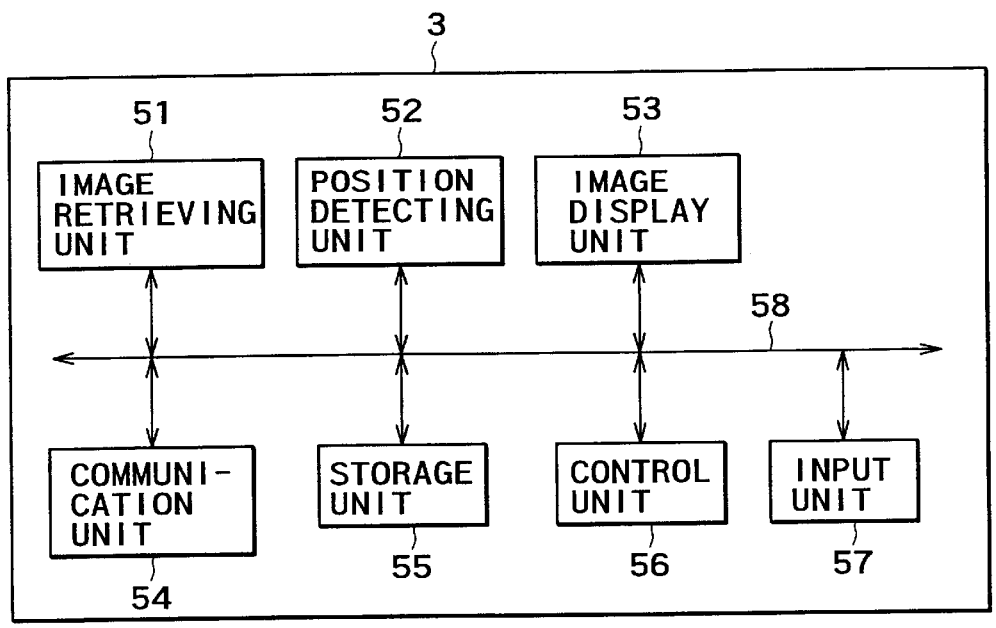

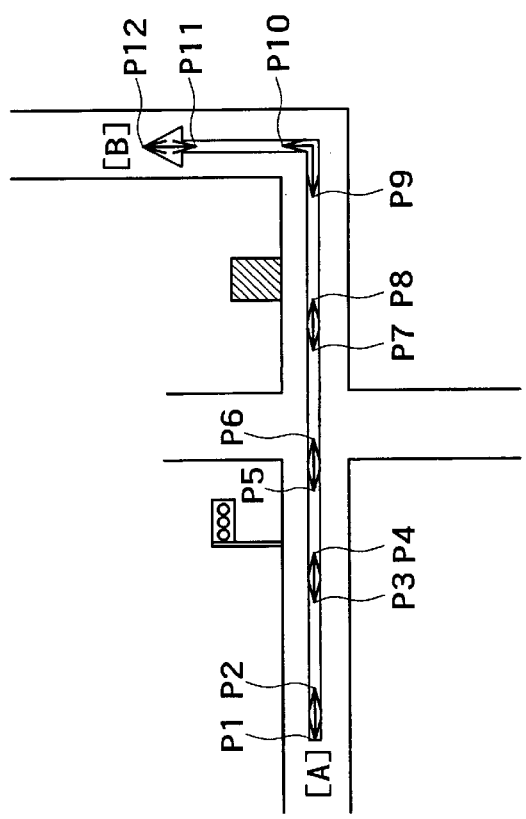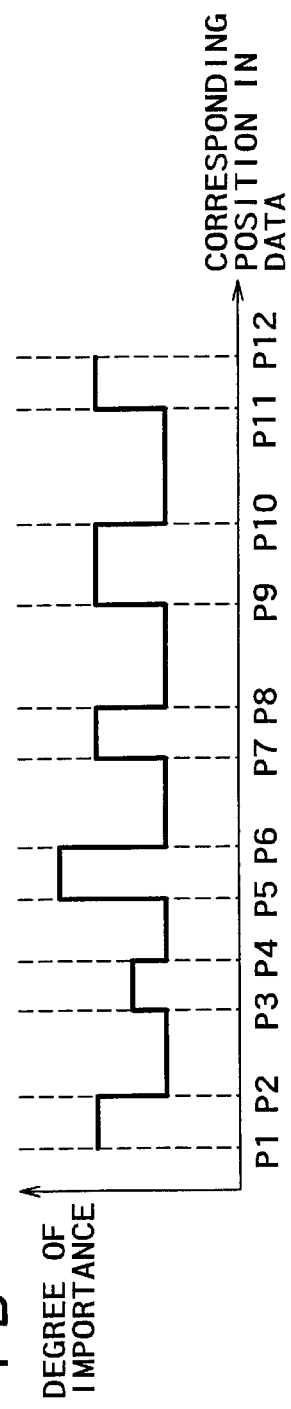
FIG. 11A
FIG. 11B

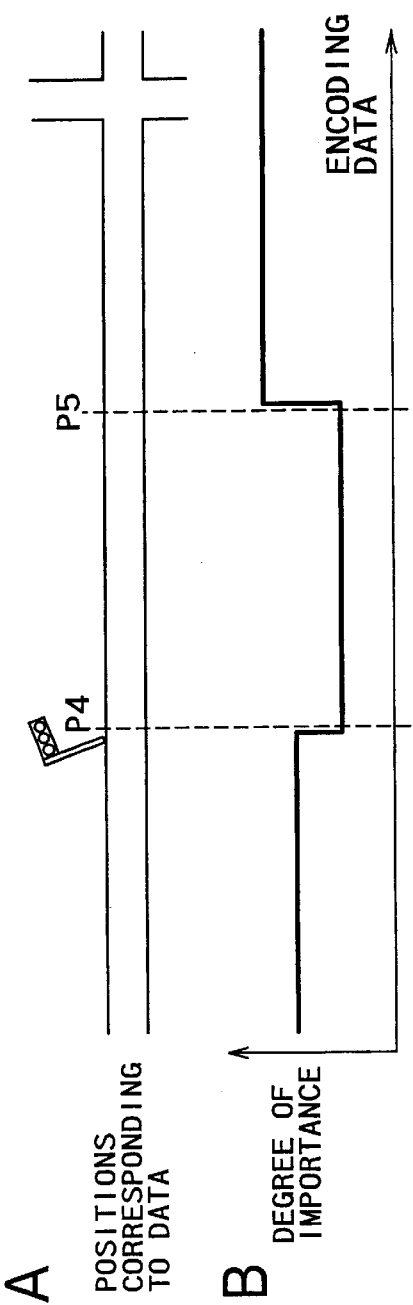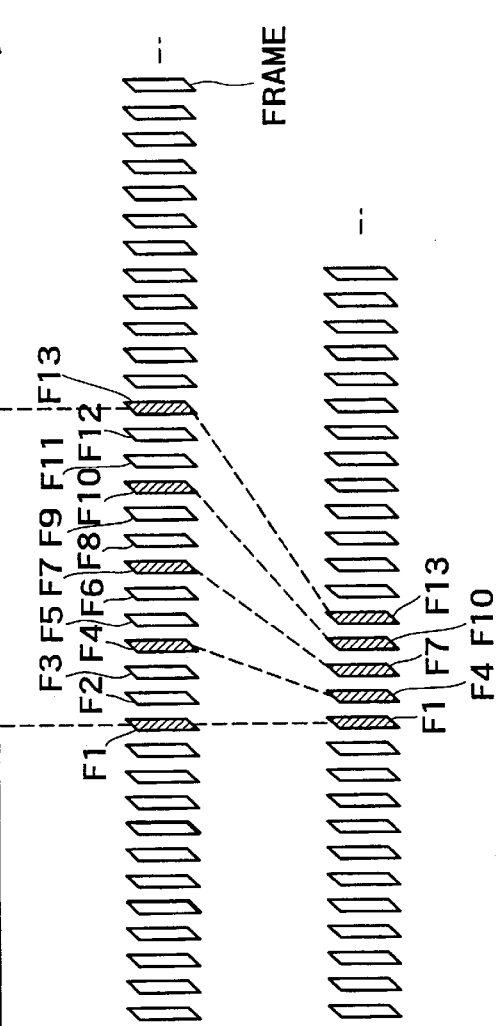
FIG. 19A
FIG. 19B
FIG. 19C
FIG. 19D

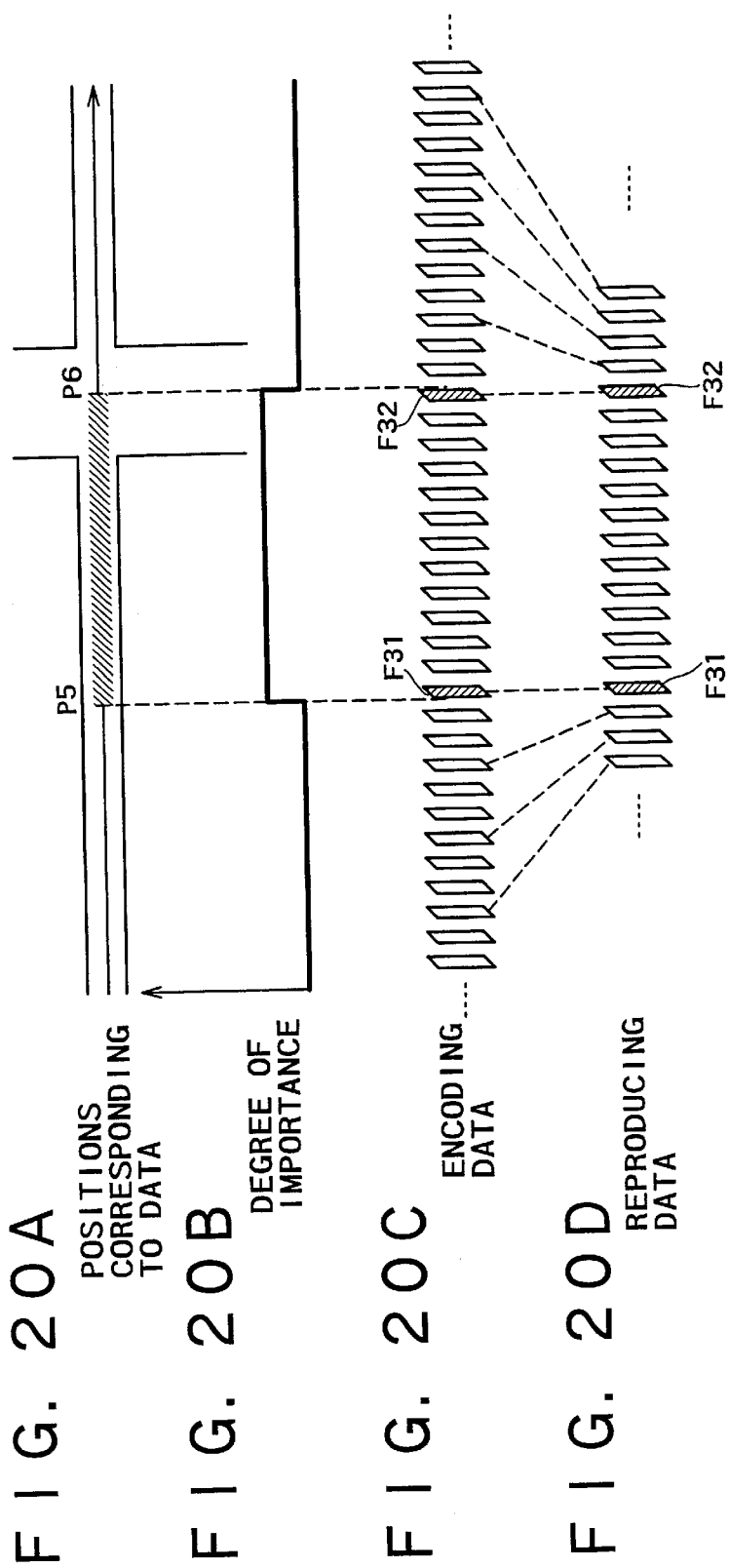

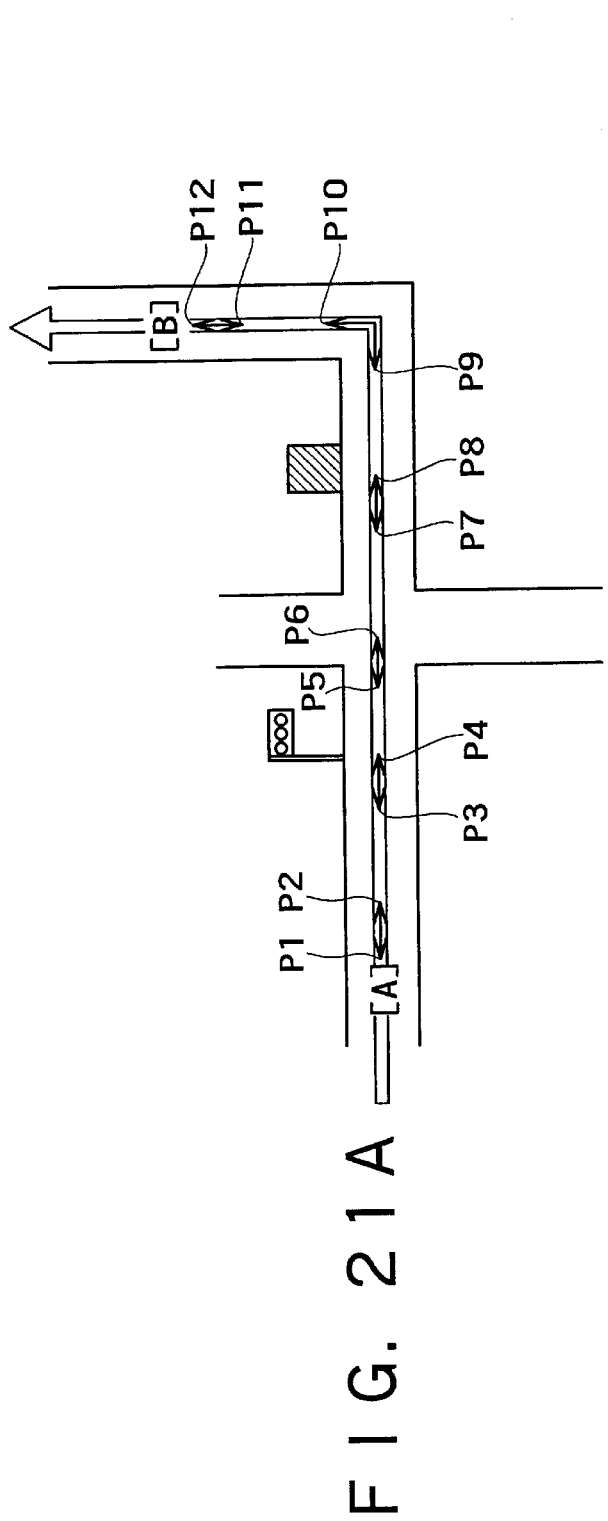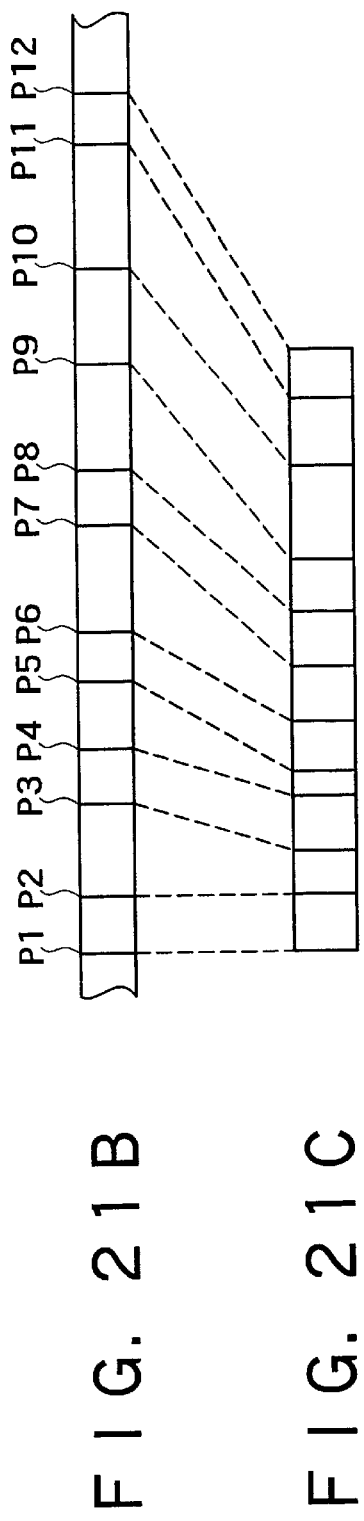
FIG. 21A
FIG. 21B
FIG. 21C

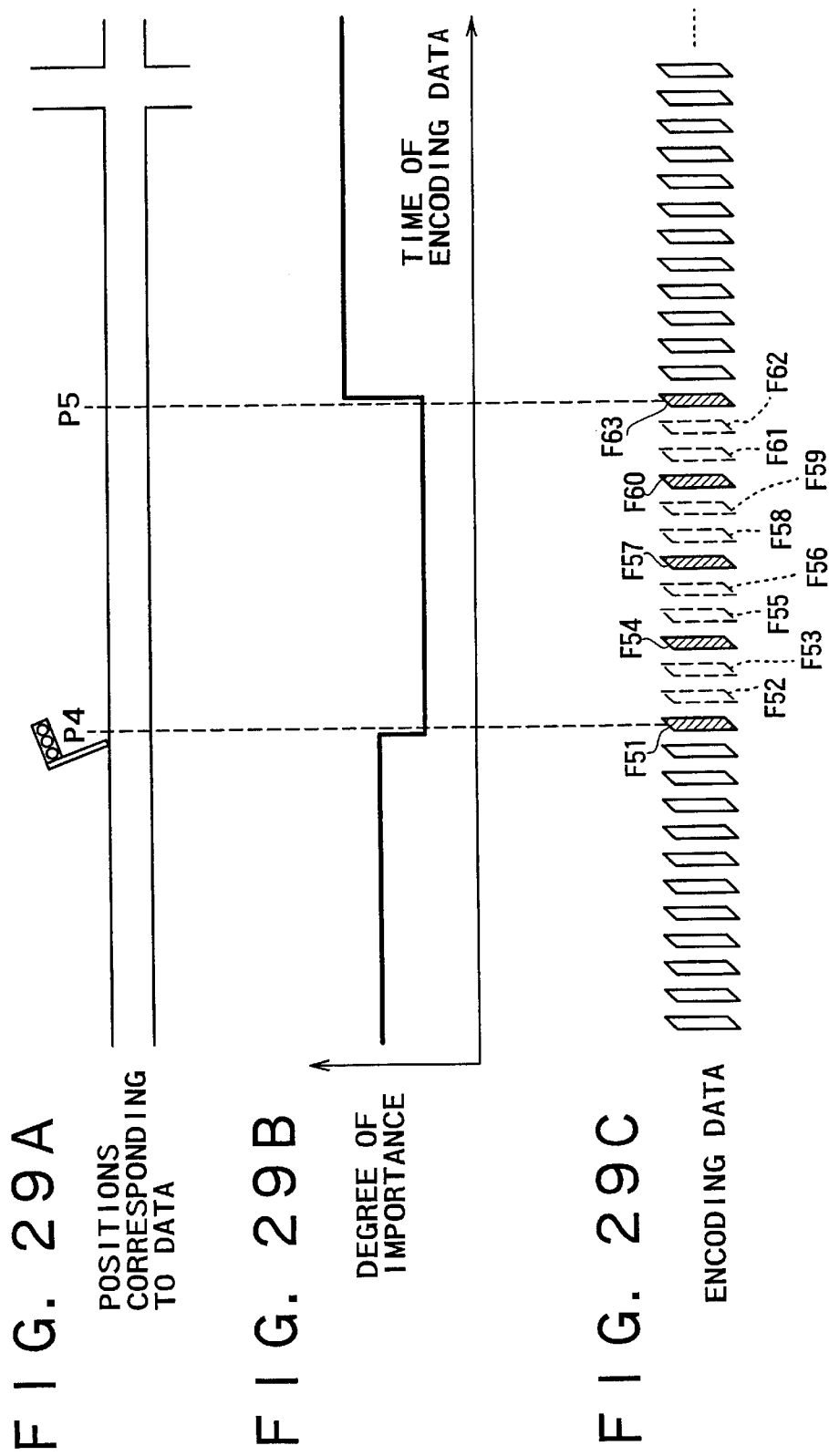

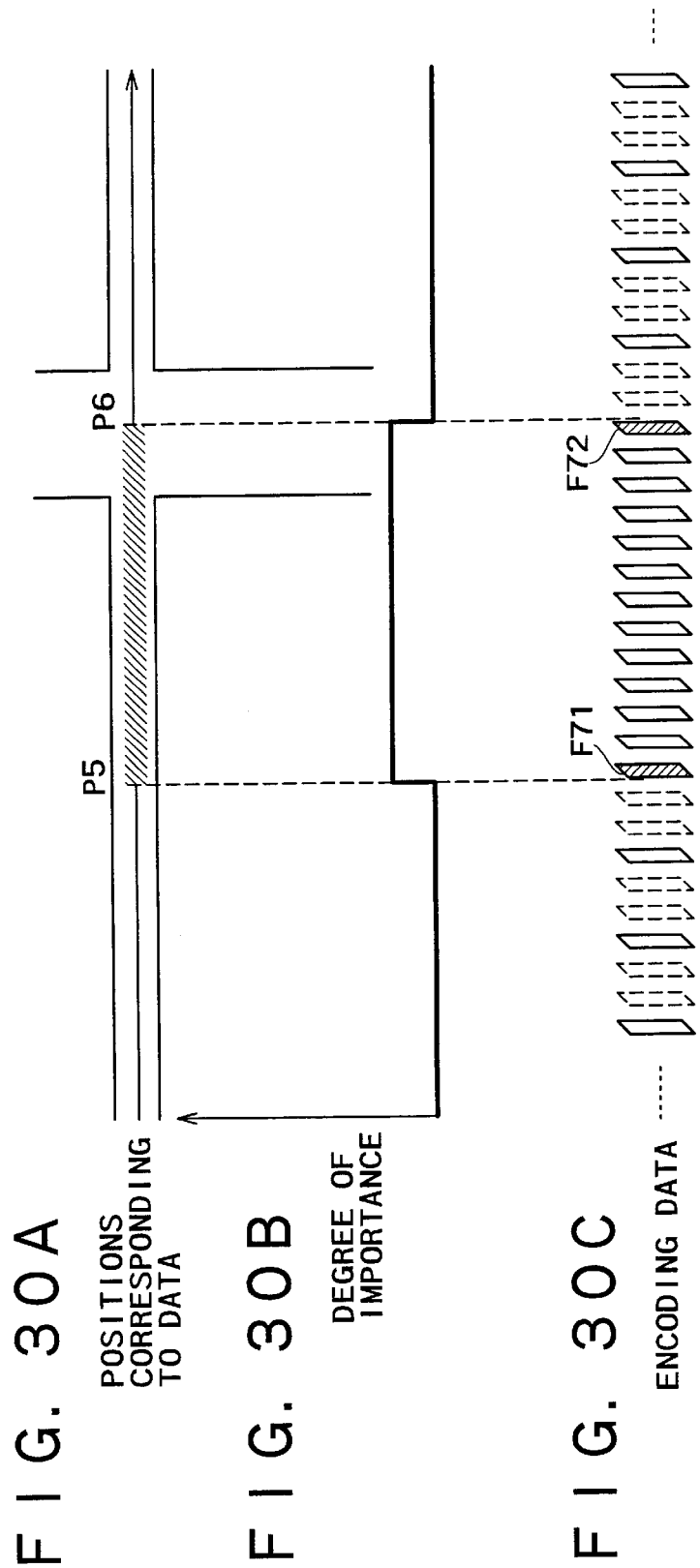

HIGH TRAVELING SPEED V1

LOW TRAVELING SPEED V2

INFORMATION PROCESSING APPARATUS AND METHOD, RECORDING MEDIUM, AND PROGRAM

BACKGROUND OF THE INVENTION

The present invention relates to an apparatus and a method for information processing, a recording medium, and a program and, particularly, to an apparatus and a method for information processing, a recording medium, and a program that can efficiently deliver data via a network according to the degree of importance of the data.

The technology of delivering various data via a network is coming into common use. For example, a conventional car navigation apparatus calculates a current position from information obtained by a GPS (Global Positioning System) and an acceleration sensor in response to the input of a destination, retrieves a route from the current position to the destination from map data prerecorded on a CD (Compact Disc) or a DVD (Digital Versatile Disc), and displays a corresponding map data by CG (Computer Graphics) or the like. However, in an actual route display, simply displaying a route on a map often does not help the user traveling on an unfamiliar road choose a correct road. Hence, there is a desire to display images on the route. However, to record route image data on a CD or a DVD together with the map data requires an enormous amount of data. Moreover, when there are trees lining the route, for example, the color and amount of leaves of the trees and the like are varied with the season. To store image data corresponding to such conditions also requires an enormous amount of data. There is thus a limit to the amount of data that can be actually handled.

In order to solve this problem, Japanese Patent Laid-Open No. 2000-32374 proposes a system in which a data generating apparatus generates data of images on the route, and a server manages the image data generated by the data generating apparatus and transfers the image data to a terminal apparatus as a car navigation apparatus for display as required via a network.

FIG. 1 is a diagram showing a car navigation system using a network, as disclosed in Japanese Patent Laid-Open No. 2000-32374. A server 1 stores image data picked up by data generating apparatuses 2-1 to 2-n installed in a plurality of different areas, in correspondence with a position on a map. Terminal apparatuses 3-1 to 3-n, as car navigation apparatus mounted in a motor vehicle or the like driven by each user himself/herself, retrieve a route from a current position to a destination in response to the input of the destination, as with the foregoing conventional car navigation apparatus, receive corresponding image data from the server 1 via a network 4, and then display the image data. Incidentally, in the description below, where there is no need to individually distinguish the data generating apparatuses 2-1 to 2-n or the terminal apparatuses 3-1 to 3-n, the data generating apparatuses 2-1 to 2-n or the terminal apparatuses 3-1 to 3-n will be referred to simply as a data generating apparatus 2 or a terminal apparatus 3. The same applies to other apparatuses.

A control unit 13 is a so-called microcomputer formed of a CPU (Central Processing Unit), a RAM (Random Access Memory), and a ROM (Read Only Memory). The control unit 13 expands a program prestored in the ROM into the RAM and executes the program to thereby control an image retrieving unit 11, a communication unit 12, and a storage unit 14 that are each connected to the control unit 13 via a bus 15. Also, the control unit 13 controls the communication unit 12 to store image data transmitted from the data generating apparatus 2 via the network 4 in the storage unit 14 together with positional information. In addition, the control unit 13 retrieves image data stored in the storage unit 14 on the basis of route information inputted from the terminal apparatus 3 to the communication unit 12 via the network 4, and then controls the communication unit 12 to transmit the retrieved image data to the terminal apparatus 3 via the network 4.

FIG. 2 shows a configuration of the data generating apparatus 2.

The data generating apparatus 2 is mounted in a motor vehicle, for example. The data generating apparatus 2 picks up image data to be used as route image data in the storage unit 14 of the server 1 and transmits the image data to the server A control unit 33 of the data generating apparatus 2 is a so-called microcomputer formed of a CPU, a RAM, and a ROM, and it controls the operation of the whole data generating apparatus 2. An image pickup unit 31 is controlled by the control unit 33 and is formed by a CCD (Charge Coupled Device), for example. The image pickup unit 31 outputs picked-up still image data to a storage unit 34 to store the still image data in the storage unit 34. The image pickup unit 31 also obtains the angular velocity from a gyro 31a included therein and outputs the angular velocity to the control unit 33. A GPS receiver 32 receives radio waves emitted from a plurality of stationary satellites not shown in the figure, thereby determines positional information of latitude and longitude on the earth, and then outputs the positional information to the control unit 33. The control unit 33 stores the image data picked up by the image pickup unit 31 in the storage unit 34 together with the corresponding angular velocity and positional information, including the latitude and longitude. The control unit 33 also controls a communication unit 35 to transmit the image data stored in the storage unit 34 to the server 1 via the network 4.

The terminal apparatus 3 is a so-called car navigation apparatus mounted in a motor vehicle or the like used by a user. A control unit 56 is a so-called microcomputer formed of a CPU, a RAM, a ROM and the like. The control unit 56 controls an image retrieving unit 51, a position detecting unit 52, an image display unit 53, a communication unit 54, a storage unit 55, and an input unit 57 that are each connected to a bus 58.

When, for example, a destination is inputted from the input unit 57 on the basis of a current position detected by the position detecting unit 52, the shortest route from the current position to the destination is retrieved from map data stored in the storage unit 55. In this case, the image retrieving unit 51 retrieves corresponding route image data stored in the storage unit 55. When the image retrieving unit 51 retrieves no data, the communication unit 54 is controlled to transmit the route information to the server 1 via the network 4 to request the image data. When receiving the image data from the server 1, the communication unit 54 stores the image data in the storage unit 55. The image retrieving unit 51 then reads the image data corresponding to the route and displays the image data on the image display unit 53.

The processing of the server 1 of recording image data transmitted from the data generating apparatus 2 will be described next. The image pickup unit 31 of the data generating apparatus 2 picks up images on the retrieved route and stores the image data in the storage unit 34. At this time, the control unit 33 stores the angular velocity outputted from the gyro 31a and positional information inputted from the GPS receiver 32 in the storage unit 34 in correspondence with the picked-up image data. The control unit 33 then controls the communication unit 35 to transmit the image data stored in the storage unit 34 in correspondence with the positional information. Specifically, as shown in FIG. 4, the image data are stored with the X set as an ID (Identifier) of still image data picked up by the image pickup unit 31 at a position indicated by positional information AA and with the Y set as an ID of still image data picked up by the image pickup unit 31 at a position indicated by positional information BB.

The control unit 33 then controls the communication unit 35 to transmit the image data stored in the storage unit 34 to the server 1 together with the positional information, as shown in FIG. 4.

The control unit 13 of the server 1 controls the communication unit 12 to receive the image data transmitted from the data generating apparatus 2 via the network 4 and store the image data in the storage unit 14 together with the positional information.

The processing of delivering image data by the server 1 on the basis of route information from the terminal apparatus 3 and displaying the image data by the terminal apparatus 3 will be described next.

When the input unit 57 of the terminal apparatus 3 is operated by the user to input a destination, the control unit 56 inquires a current position of the position detecting unit 52 and retrieves a route from the current position to the destination on the basis of the map data stored in the storage unit 55. The image retrieving unit 51 retrieves image data stored in the storage unit 55 on the basis of the retrieved route information. When the desired image data is not stored in the storage unit 55, the control unit 56 controls the communication unit 54 to transmit the route information to the server 1 and request corresponding image data.

The control unit 13 of the server 1 controls the communication unit 12 to receive the route information and a signal requesting image data from the terminal apparatus 3. The control unit 13 controls the image retrieving unit 11 to retrieve image data stored in the storage unit 14 on the basis of the route information transmitted from the terminal apparatus 3. At this time, the image retrieving unit 11 retrieves a still image data ID corresponding to positional information, as shown in FIG. 4, on the basis of the route information and, thereby, retrieves the corresponding still image data. The control unit 13 controls the communication unit 12 to transmit the image data retrieved by the image retrieving unit 11 to the terminal apparatus 3 via the network 4.

The control unit 56 of the terminal apparatus 3 controls the communication unit 54 to receive the image data from the server 1 and store the image data in the storage unit 55. The control unit 56 reads from the storage unit 55 the image data corresponding to the positional information inputted from the position detecting unit 52 and displays the image data on the image display unit 53.

Such processing allows the terminal apparatus 3 to obtain the image data corresponding to the retrieved route from the server 1 and display the image data.

However, in the case of the car navigation system using the server 1, as shown in FIG. 1, image data stored in the storage unit 14 are delivered regardless of the band of the network (transmission medium) 4 where transmission is possible, the congestion status of transmission traffic, the performance of the terminal apparatus 3 and the like.

Therefore, the communication takes too much time, and, also, the communication's cost is increased.

In addition, when the terminal apparatus 3 requests image data corresponding to a route from a point A to another point B, the storage unit 14 of the server 1 does not necessarily store the requested image data corresponding to the route information. Therefore, in order to deal with every route combination, a mass storage device capable of storing an enormous amount of image data for all the routes will be provided as the storage unit 14 of the server 1, thus increasing the cost of the storage device.

On the other hand, with only image data limited by the storage capacity of the storage unit 14 of the server 1, routes that the server 1 can provide to the terminal apparatus 3 are limited. Even if a selection is made from the images stored in the storage unit 14 to obtain images including those of point A and point B, images including those of unnecessary sections preceding point A and succeeding point B are delivered, thus unnecessarily increasing the communication cost.

Furthermore, since the car navigation system shown in FIGS. 1 to 3 only can select data, such as images, and deliver the data back to the terminal apparatus 3 in response to a request from the terminal apparatus 3 at all times, the car navigation system cannot meet the desire to broadcast to multiple terminal apparatuses 3.

SUMMARY OF THE INVENTION

The present invention has been made in view of the above, and it is accordingly an object of the present invention to efficiently deliver data via a network.

According to the present invention, there is provided an information processing apparatus which includes: moving image data storing means for storing moving image data; degree of importance setting means for setting the degree of importance of the moving image data; thinning-out means for thinning out the moving image data on the basis of the degree of importance and, thereby, generating thinned-out data; and transmitting means for transmitting the thinned-out data to another information processing apparatus.

The information processing apparatus can further include map data storing means for storing map data and traveling route retrieving means for retrieving a traveling route from a specified starting position to a specified destination on the basis of the map data, wherein the degree of importance setting means sets the degree of importance of the moving image data corresponding to the traveling route.

According to the present invention, there is provided a first information processing apparatus which includes: moving image data recording means for recording moving image data; degree of importance setting means for setting the degree of importance of the moving image data; storing means for storing the moving image data and the degree of importance; and transmitting means for transmitting the moving image data and the degree of importance to another information processing apparatus.

The moving image data can be moving image data for a guiding route, and the degree of importance can be the degree of importance on the guiding route.

The degree of importance setting means can set high the degree of importance of moving image data of a section near a main point on the guiding route.

The main point can include a starting point, an ending point, a signal, a sign, or an access to and an exit from an expressway, an intersection, a main building, or a station on the guiding route.

According to the present invention, there is provided a second information processing apparatus which includes: moving image data receiving means for receiving moving image data transmitted from another information processing apparatus; degree of importance setting means for setting the degree of importance of the moving image data; and reproducing means for reproducing the moving image data on the basis of the degree of importance.

The information processing apparatus and method according to the present invention store moving image data, set degree of importance of the moving image data, thin out the moving image data on the basis of the degree of importance and thereby generate thinned-out data, and transmit the thinned-out data to another information processing apparatus. Therefore, it is possible to reduce an amount of data delivered to the data terminal apparatus and thereby improve the communication cost and the communication speed.

In addition, the information processing apparatus and method according to the present invention record moving image data, set the degree of importance of the moving image data, store the moving image data and the degree of importance, and transmit the moving image data and the degree of importance to another information processing apparatus.

Furthermore, the information processing apparatus and method according to the present invention receive moving image data transmitted from another information processing apparatus, set the degree of importance of the moving image data, and reproduce the moving image data on the basis of the degree of importance.

With any of the information processing apparatus and method, it is consequently possible to reduce the amount of data delivered to the data terminal apparatus and thereby improve the communication cost and the communication speed.

BRIEF DESCRIPTION OF THE DRAWINGS

FIG. 1 is a diagram of assistance in explaining a configuration of a conventional server;

FIG. 3 is a diagram of assistance in explaining a conventional terminal apparatus;

FIGS. 11A and 11B are diagrams of assistance in explaining the degree of importance;

FIGS. 19A, 19B, 19C, and 19D are diagrams of assistance in explaining the encoding of route image data according to degree of importance;

FIGS. 20A, 20B, 20C, and 20D are diagrams of assistance in explaining the encoding of route image data according to degree of importance;

FIGS. 21A, 21B, and 21C are diagrams of assistance in explaining the encoding of route image data according to degree of importance;

FIGS. 29A, 29B, and 29C are diagrams of assistance in explaining the encoding of route image data according to degree of importance;

FIGS. 30A, 30B, and 30C are diagrams of assistance in explaining the encoding of route image data according to degree of importance;

DETAILED DESCRIPTION OF THE PREFERRED EMBODIMENTS

Figure 5:
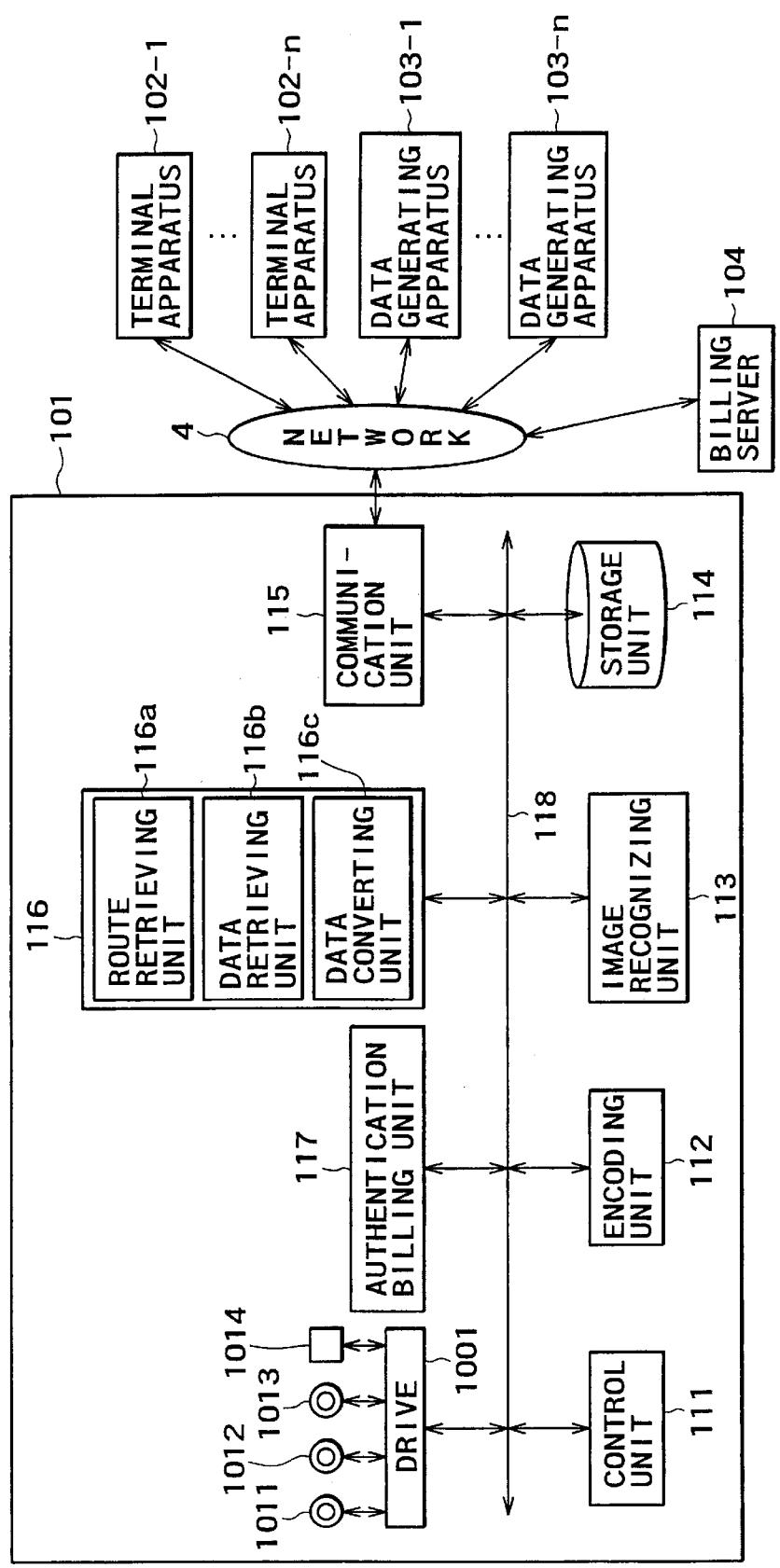
FIG. 5 is a diagram of assistance in explaining a configuration of an embodiment of a server to which the present invention is applied.

FIG. 5 is a diagram showing a configuration of an embodiment of a car navigation system according to the present invention. In FIG. 5 and figures succeeding FIG. 5, parts corresponding to those of the conventional system are identified by the same reference numerals, and a description of the parts will be omitted where desired.

A server 101 basically performs similar processing to that of the foregoing server 1. However, the server 101 retrieves a route from a starting position to a destination, encodes moving image data of the retrieved route by a predetermined method, and transmits the result to a terminal apparatus 102.

A control unit 111 is a so-called microcomputer formed of a CPU, a RAM, and a ROM, and it controls the operation of the whole server 101. The control unit 111 reads and executes a program recorded on a magnetic disk 1011, a magneto-optical disk 1012, an optical disk 1013, and a semiconductor memory 1014 inserted into a drive 1001 connected to the control unit 111 via a bus 118. The control unit 111 also records various data and the like onto the magnetic disk 1011, the magneto-optical disk 1012, the optical disk 1013, and the semiconductor memory 1014, as required. When image data is to be transferred to the terminal apparatus 102, an encoding unit 112 encodes the image data to be transferred by a predetermined method. The encoding method will be described later.

An image recognizing unit 113 recognizes information indicating the characteristics of a picked-up image in image data transmitted from a data generating apparatus 103 and then calculates the degree of importance of the image data. A storage unit 114 is formed of a so-called hard disk drive or the like, and it has the image data transmitted from the data generating apparatus 103, the map data required to retrieve a route and the like recorded thereon. Thus, as moving-image data transmitted from a plurality of data generating apparatus 103 are accumulated, a database of moving image data of routes is constructed.

A communication unit 115 is formed of a so-called modem or the like, and it communicates with the terminal apparatus 102, the data generating apparatus 103, and a billing server 104 via a network 4 formed by a telephone network or a radio communication network.

A data processing unit 116 includes a route retrieving unit 116a, a data retrieving unit 116b, and a data converting unit 116c, and it performs various data processing. The route retrieving unit 116a retrieves information of a shortest route on the basis of the information of the starting position and the destination inputted from the terminal apparatus 102 and the map data stored in the storage unit 114. The data retrieving unit 116b retrieves and reads data of moving images on the route from the moving image data stored in the storage unit 114 on the basis of the route information retrieved by the route retrieving unit 116a or route information transmitted from the terminal apparatus 102. The data converting unit 116c edits the image data retrieved by the data retrieving unit 116b, as required, to thereby convert the image data into required moving image data.

An authentication billing unit 117 identifies a user on the basis of an ID transmitted from the terminal apparatus 102 and performs billing processing to a billing server 104 via the network 4 for charges associated with route retrieval processing and the transmission of corresponding image data. The billing processing may be performed by charging directly to an account specified by the user via the billing server 104, providing a not shown reading device such as, for example, a prepaid card and subtracting points corresponding to the charges, or accumulating the results of billing processing and charging directly to the account specified by the user once a month, for example.

The configuration of the terminal apparatus 102 will next be described with reference to FIG. 6. The terminal apparatus 102 is a so-called car navigation apparatus mounted in a motor vehicle.

A communication unit 131 is formed by a so-called modem or the like. The communication unit 131 is controlled by a control unit 135 to transmit the information of the starting point and the destination to the server 101 and receive the route information and the image data transmitted from the server 101. A decoding unit 132 decodes the image data received in an encoded state and once stored in a storage unit 134, and then it outputs the result to a display unit 133 formed by an LCD (Liquid Crystal Display) or the like for display.

The storage unit 134 is formed by a so-called hard disk drive or the like. The storage unit 134 is controlled by the control unit 135 to store the image data received by the communication unit 131, output the image data decoded by the decoding unit 132 to the display unit 133 for display, and store ID information for identifying the terminal apparatus 102 itself.

The control unit 135 is a so-called microcomputer formed of a CPU, a RAM, and a ROM, and it controls the operation of the whole terminal apparatus 102. The control unit 135 reads and executes a program recorded on a magnetic disk 1111, a magneto-optical disk 1112, an optical disk 1113, and a semiconductor memory 1114 inserted into a drive 1101 connected to the control unit 135 via a bus 137. The control unit 135 also writes data to the magnetic disk 1111, the magneto-optical disk 1112, the optical disk 1113, and the semiconductor memory 1114, as required.

An input unit 136 is formed of a tablet button, a keyboard or the like, and it is operated by the user when specifying a starting position and a destination.

The data generating apparatus 103 will be described with reference to FIG. 7.

Figure 2:
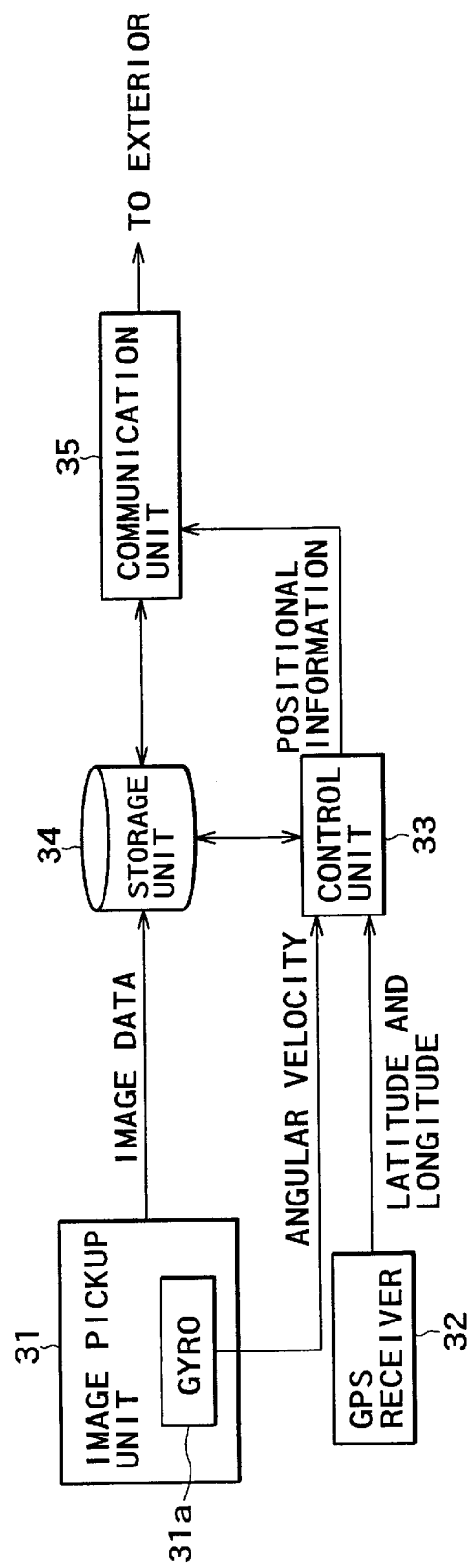
FIG. 2 is a diagram of assistance in explaining a conventional data generating apparatus.
Figure 4:
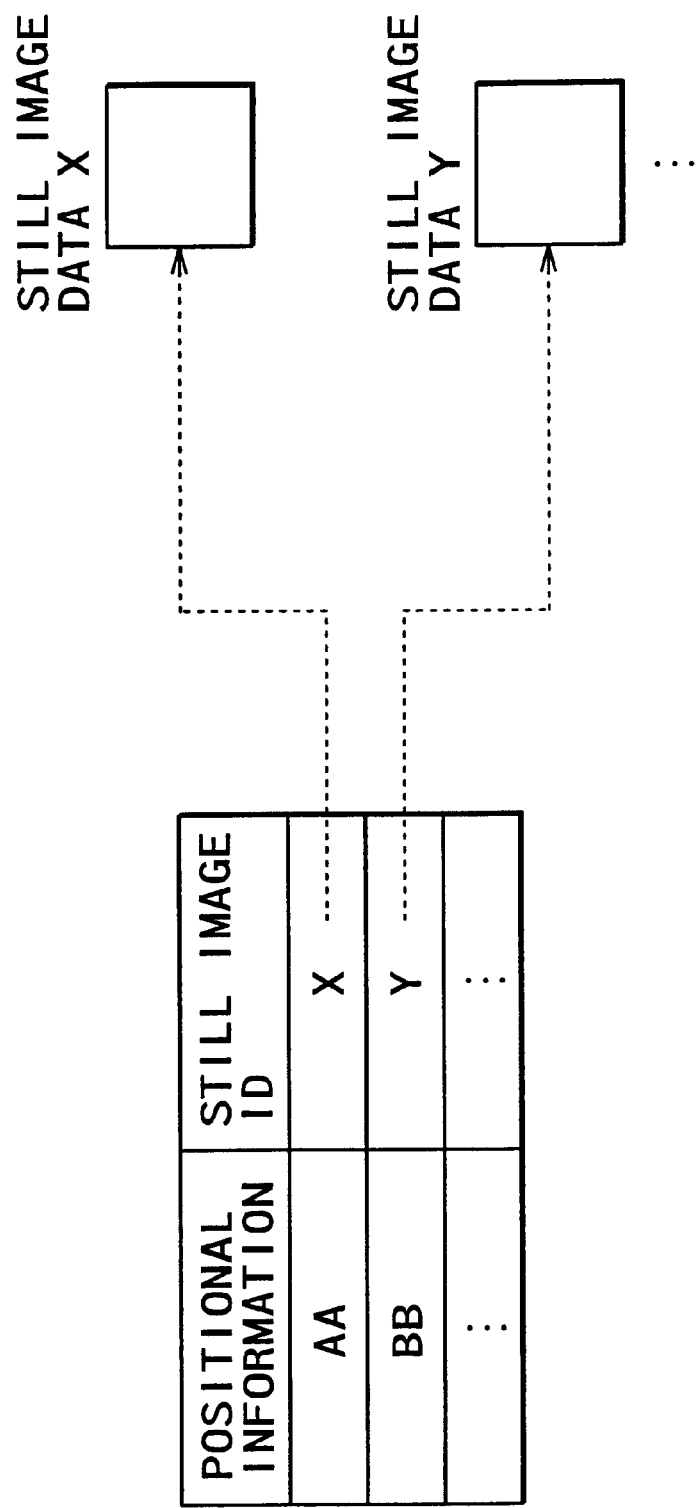
FIG. 4 is a diagram of assistance in explaining a conventional method of recording image data.
Figure 7:
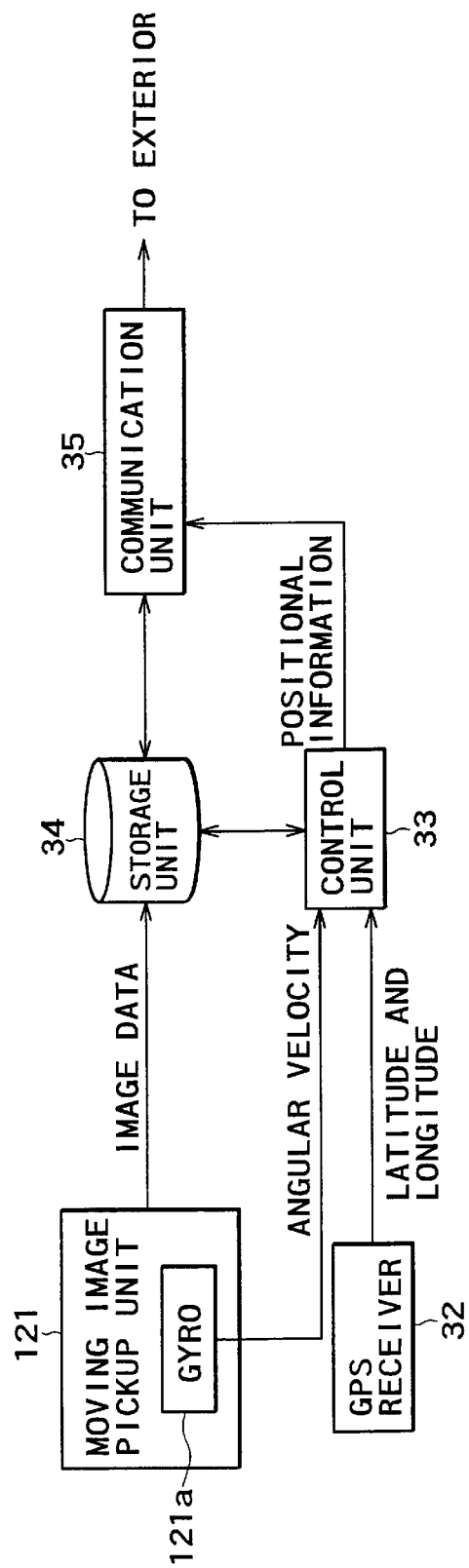
FIG. 7 is a diagram of assistance in explaining a data generating apparatus to which the present invention is applied.

The data generating apparatus 103 of FIG. 7 is basically of the same configuration as the data generating apparatus 2 of FIG. 2. The data generating apparatus 103 of FIG. 7 is different from the data generating apparatus 2 of FIG. 2 in that the data generating apparatus 103 of FIG. 7 is provided with a moving image pickup unit 121 in place of the image pickup unit 31. The moving image pickup unit 121 picks up a moving image and then outputs the moving image as moving image data to a storage unit 34. The moving image data are associated with positional information and then stored in the storage unit 34. Incidentally, the moving image pickup unit 121 is of course allowed to pick up a still image by switching the mode.

Figure 8:
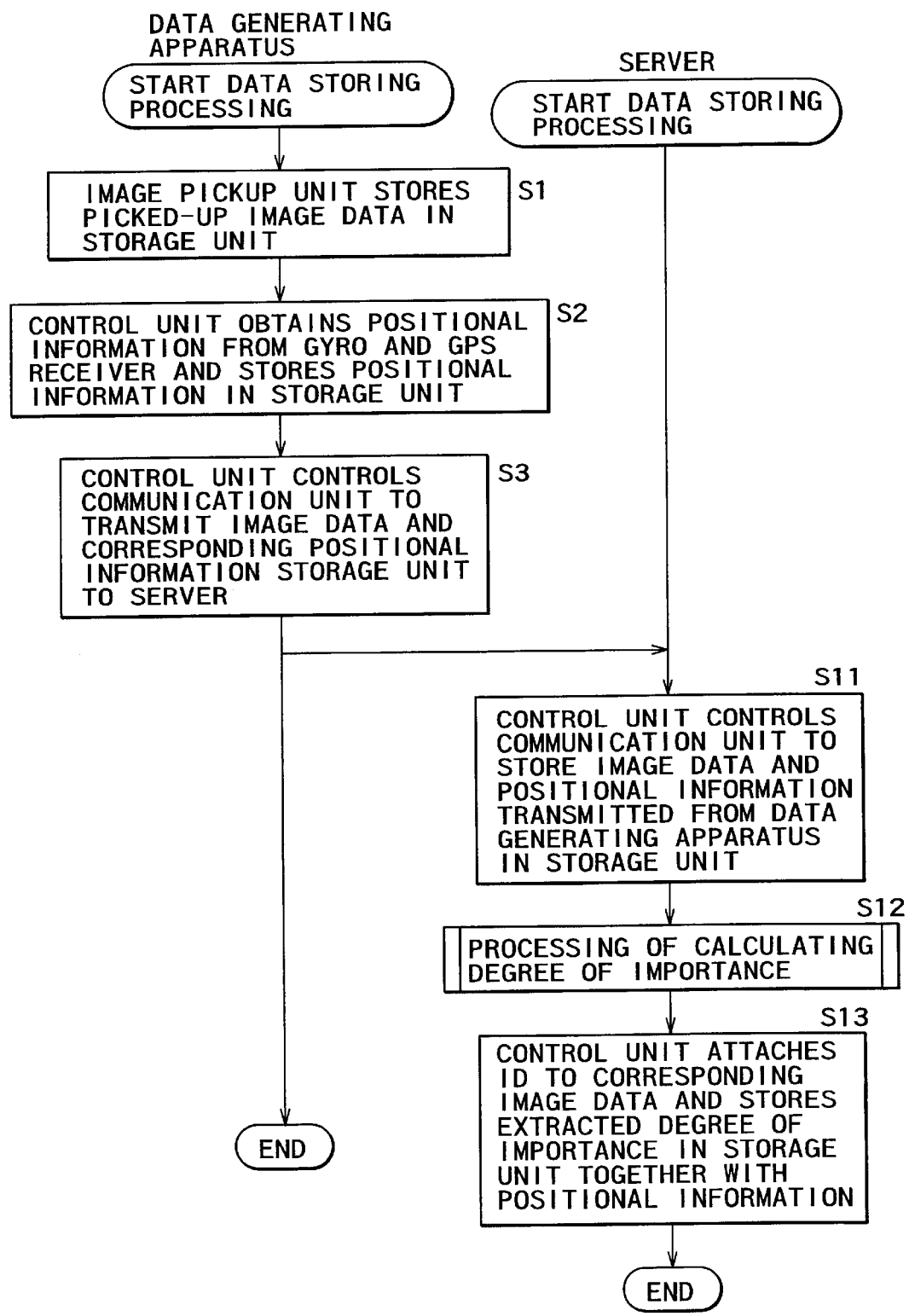
FIG. 8 is a diagram of assistance in explaining data storage processing.

The processing of the server 101 storing image data transmitted from the data generating apparatus 103 will next be described with reference to the flowchart of FIG. 8.

At a step S1, the image pickup unit 121 of the data generating apparatus 103 stores the image data of a picked-up moving image in the storage unit 34. At a step S2, a control unit 33 generates positional information from information of angular velocity, latitude, and longitude obtained from a gyro 121a and a GPS receiver 32, associates the positional information with the moving image data, and then stores the positional information in the storage unit 34. At a step S3, the control unit 33 controls a communication unit 35 to transmit the image data stored in the storage unit 34 to the server 101 via the network 4.

At a step S11, the control unit 111 of the server 101 controls the communication unit 115 to receive the image data transmitted from the data generating apparatus 103 via the network 4 and store the image data in the storage unit 114.

At a step S12, the image recognizing unit 113 performs the process of calculating the degree of importance on the basis of the image data stored in the storage unit 114.

Figure 9:
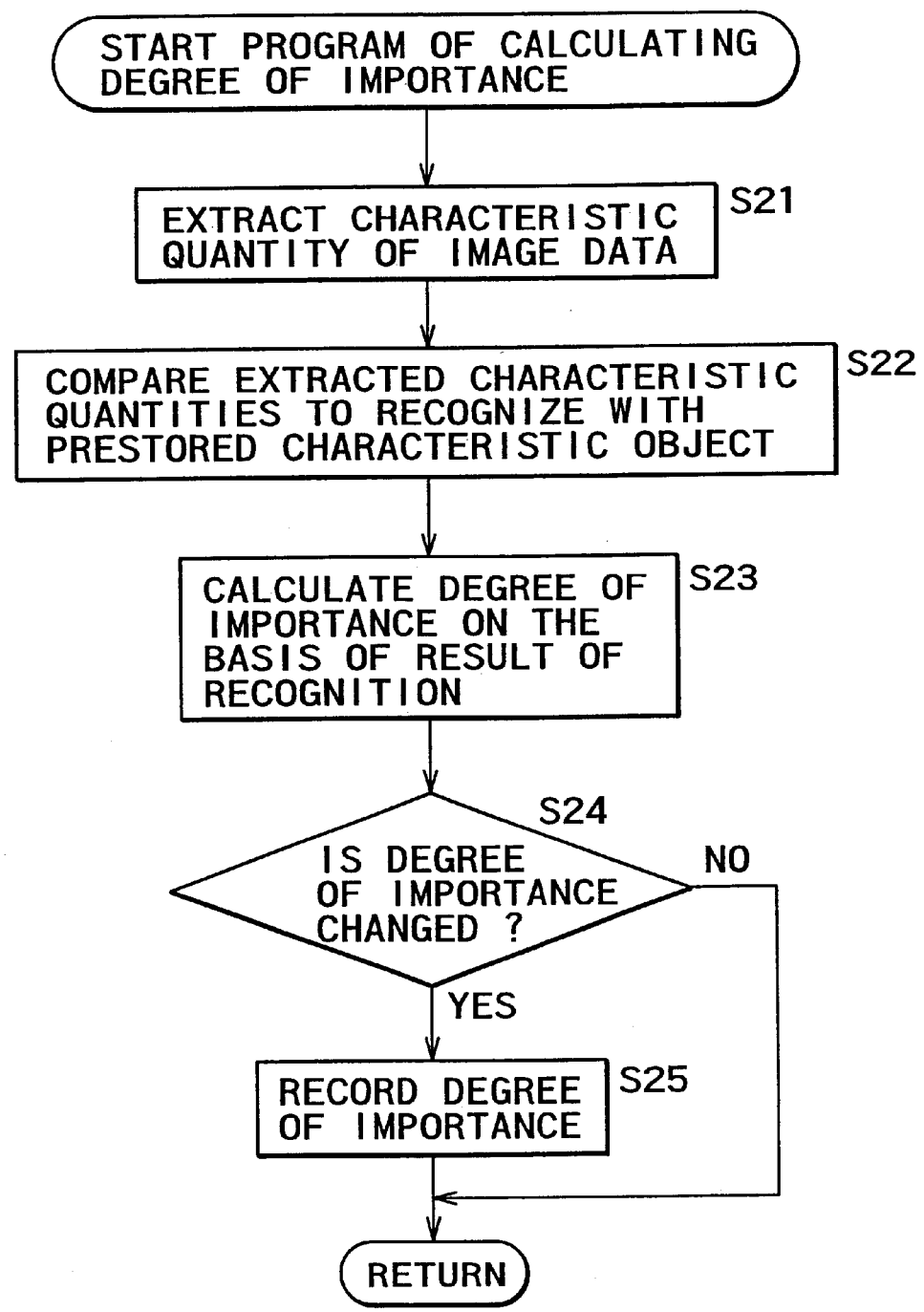
FIG. 9 is a flowchart of assistance in explaining the process of calculating the degree of importance.
Figure 10:
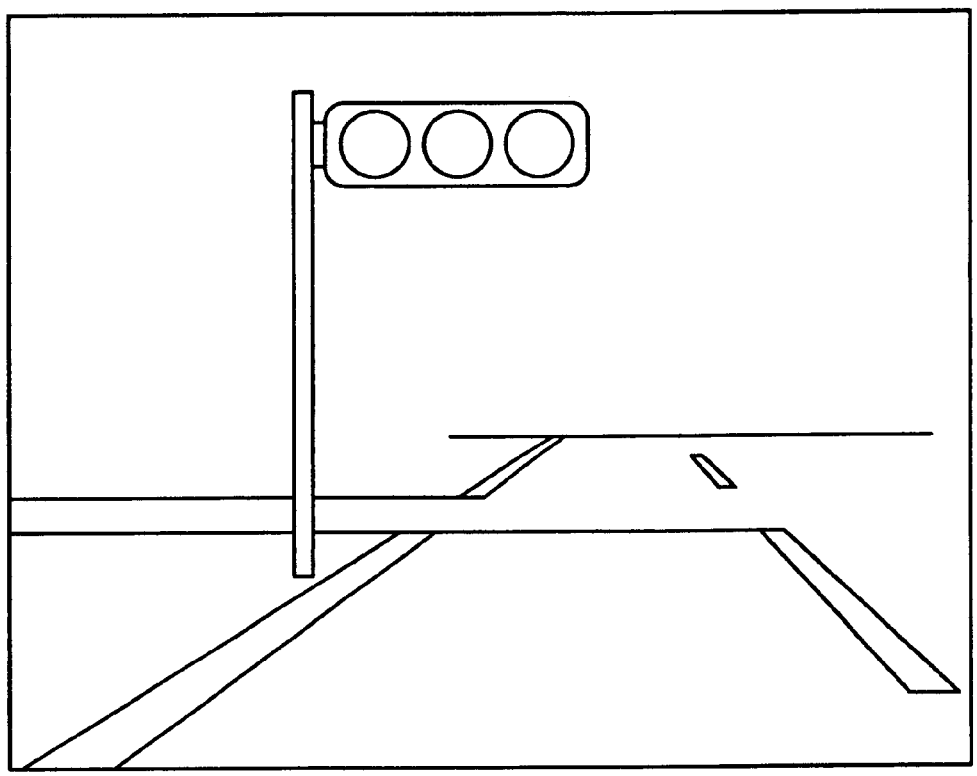
FIG. 10 is a diagram of assistance in explaining the detection of characteristic quantities of image data.

The process of calculating the degree of importance by the image recognizing unit 113 will be described in the following with reference to a flowchart of FIG. 9. At a step S21, the image recognizing unit 113 reads the image data stored in the storage unit 114 and then extracts a characteristic quantity of the image data. Specifically, in a case of image data of an image as shown in FIG. 10, for example, there is a traffic signal, and therefore when a row of three round objects that are blue, yellow, and red, respectively, is detected, information of the three round objects is converted into a numerical form and, thereby, extracted (calculated) as a characteristic quantity of the image data. In the case of the image shown in FIG. 10, there is also an intersection, and therefore information of roads represented by straight lines intersecting each other substantially perpendicularly also is converted into a numerical form and extracted (calculated) as a characteristic quantity.

At a step S22, the image recognizing unit 113 compares the extracted characteristic quantity with prestored characteristic quantities to thereby recognize the object. Specifically, in the case of the image as shown in FIG. 10, the image recognizing unit 113 compares the characteristic quantity of the information of the row of three round objects that are blue, yellow, and red, respectively, and the prestored characteristic quantities (compares numerical values) with each other, and thereby recognizes that the traffic signal is picked up as a landmark object. Also, since the roads represented by the straight lines in the image intersect each other substantially perpendicularly, the image recognizing unit 113 recognizes the existence of the intersection.

At a step S23, the image recognizing unit 113 calculates the degree of importance on the basis of the recognized object. In the case of FIG. 10, for example, since the traffic signal and the intersection are recognized as objects and thus there are two characteristics on the image, the image recognizing unit 113 calculates that the degree of importance is two. When only one of the traffic signal and the intersection is recognized, the image recognizing unit 113 calculates that the degree of importance is one. When no object is recognized, the image recognizing unit 113 calculates that the degree of importance is zero. Other values may be set as values of the degree of importance.

At a step S24, the image recognizing unit 113 determines whether the degree of importance is changed. Specifically, the degree of importance of moving image data is set to zero in a default state, and the degree of importance is not changed when moving image data with no object serving as a mark continues. In the case where the image as shown in FIG. 10 is picked up, for example, there are objects serving as a mark, that is, the traffic signal and the intersection. Therefore, the image recognizing unit 113 determines that the degree of importance is changed, and the processing proceeds to a step S25.

At the step S25, the image recognizing unit 113 records the degree of importance corresponding to the image data and then ends the processing.

When the image recognizing unit 113 determines at step S24 that the degree of importance is not changed, the processing at step S25 is skipped, and then the processing is ended.

As a result of such processing, the image data has the degree of importance set according to the picked-up image; however, the degree of importance may be set from the map data. For example, in a case of data of moving images on a route as shown in FIG. 11A, the degree of importance is set to two, as shown in FIG. 11B in a section from a position P1 (indicated by [A] in FIG. 11A) to a position P2 around the starting position (indicated by [A] in FIG. 11A), for example. In a section from a position P3 to a position P4 immediately in front of a traffic signal S serving as a mark, the degree of importance is set to one. In a section from a position P5 to a position P6 immediately in front of an intersection with a broad road serving as a most significant mark as shown in FIG. 11A, the degree of importance is set to the highest value of three, as shown in FIG. 11B. In a section from a position P7 to a position P8, there is a building B serving as a mark, as shown in FIG. 11A, and therefore the degree of importance is set to two, as shown in FIG. 11B. In a section from a position P9 to a position P10, there is a corner serving as a mark, as shown in FIG. 11A, and therefore the degree of importance is set to two, as shown in FIG. 11B. As shown in FIG. 11A, a section from a position P11 to a position P12 is situated around a destination (indicated by [B] in FIG. 11A), and therefore the degree of importance is set to two, as shown in FIG. 11B. As shown in FIG. 11A, in other sections from the position P2 to the position P3, from the position P4 to the position P5, from the position P6 to the position P7, from the position P8 to the position P9, and from the position P10 to the position P11, there are no particular marks, and therefore the degree of importance is set to zero, as shown in FIG. 11B.

Thus, while in the example described above, the image recognizing unit 113 extracts a characteristic quantity and sets a degree of importance on the basis of the characteristic quantity of shape, color and the like recognized as an image, the degree of importance may be set for the section from the position P5 to the position P6 immediately in front of the major intersection and the corner in the section from the position P9 to the position P10 on the basis of the map data prestored in the storage unit 114, as shown in FIGS. 11A and 11B, for example. Also, while in the example described above, an integer of 0 to 3 is used as the setting value of the degree of importance, the setting value may not be in steps, and the setting value may be obtained by weighting the characteristic quantity and performing an operation using the function. In addition, a high degree of importance may be set to information on a map generally considered landmarks on the map, such as a station, a building, a sign, or an access to and an exit from an expressway and the like.

Returning to the flowchart of FIG. 8, a description will be made in the following.

Figure 12:
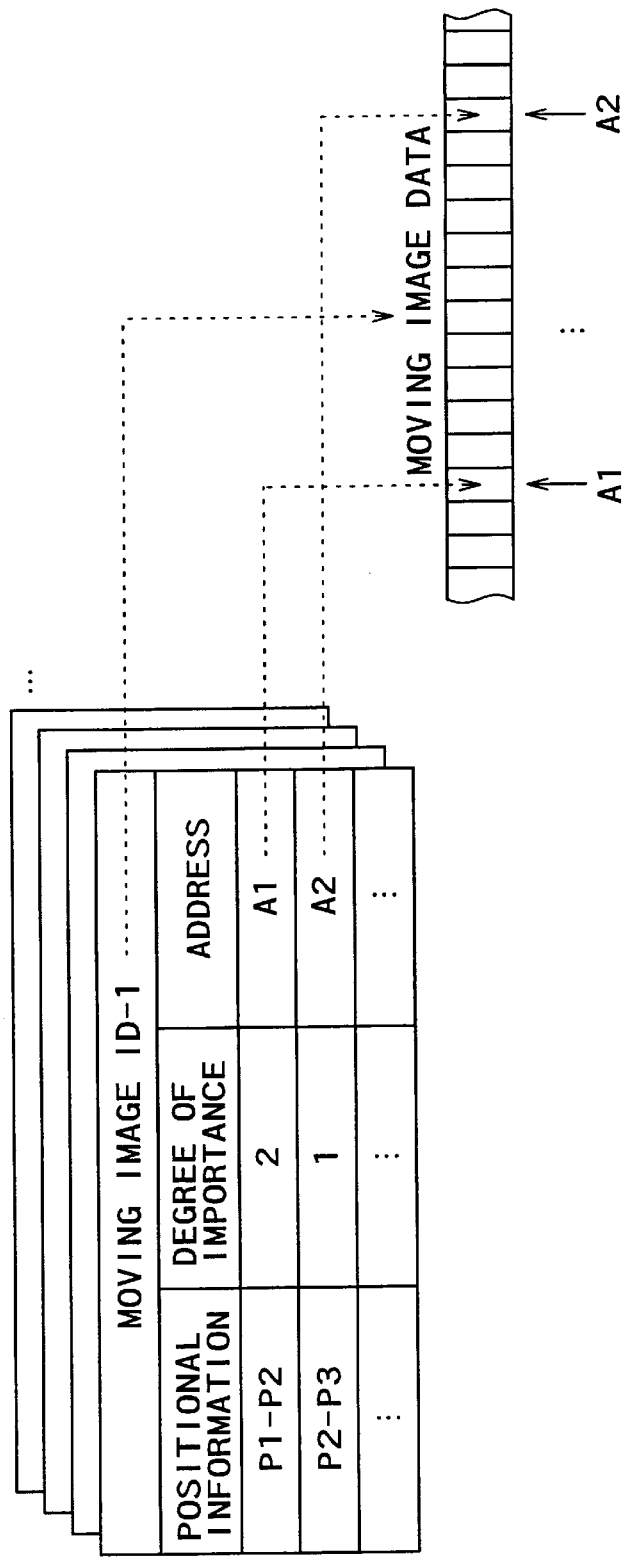
FIG. 12 is a diagram of assistance in explaining a method of recording image data according to the present invention.

At a step S13, the control unit 111 stores the extracted degree of importance and the corresponding image data and positional information in the storage unit 114. Specifically, the control unit 111 sets a moving image ID to each piece of moving image data and stores positional information, a degree of importance, and an address on the moving image data that are associated with the moving image data in the storage unit 114. For example, FIG. 12 shows that moving image data in which moving image ID of one is set have "P1–P2" set as positional information indicating a position where the moving image data is picked up, the positional information indicates image data corresponding to the, section from the position P1 to the position P2 in FIGS. 11A and 11B, and two is set as the degree of importance of the image data. In addition, the number of the starting frame of the moving image data is recorded as address information. In this case, information indicating that the image data corresponding to the section from the position P1 to the position P2 is recorded in a section from a frame number A1 to a frame number A2-1 and indicating that image data corresponding to the section from the position P2 to the position P3 is recorded in a section from a frame number A2 on down is recorded as the address information.

As a result of the processing described above, the server 101 stores the image data in correspondence with the positional information and the degree of importance. When information of a starting position and a destination is inputted from the terminal apparatus 102 to the server 101 via the network 4, the server 101 retrieves a route and then transmits retrieved image data to the terminal apparatus 102.

Figure 13:
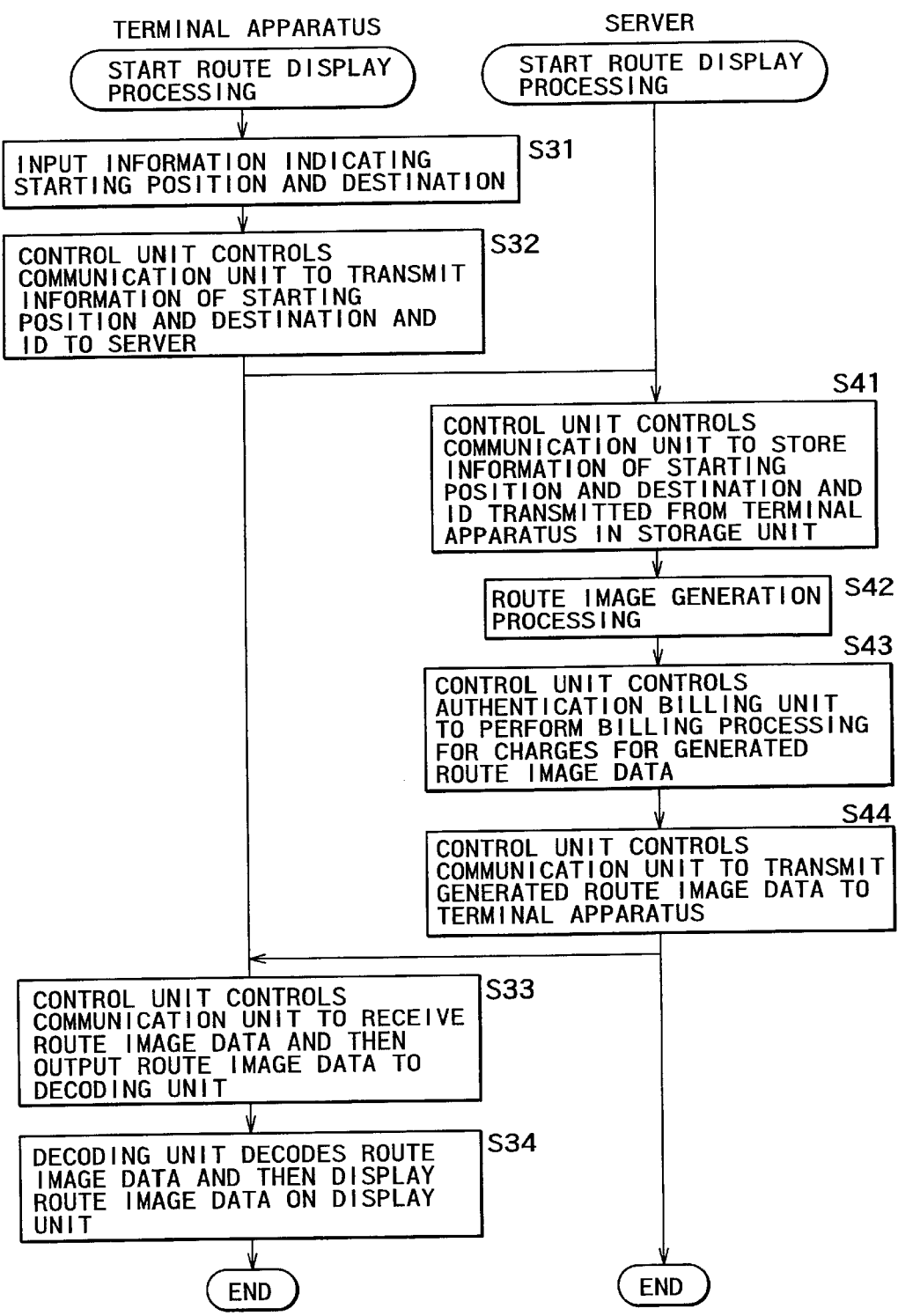
FIG. 13 is a flowchart of assistance in explaining route display processing.

The process of the terminal apparatus 102 requesting route image data from the server 101 and the server 101 transmitting the route image data for display will next be described with reference to the flowchart of FIG. 13.

At a step S31, the input unit 136 is operated to input a starting position and a destination. In this case, the starting position is inputted by the input unit 136; however, the starting position may be obtained from positional information based on the information of latitude and longitude detected by a position detecting unit 52 formed by, for example, a GPS receiver or the like. At a step S32, the control unit 135 controls the communication unit 131 to transmit the information of the starting position and the destination, as well as the ID for identifying the terminal apparatus 102 itself (or the ID for identifying the user), to the server 101 via the network 4.

At a step S41, the control unit 111 of the server 101 controls the communication unit 115 to receive the information of the starting position, the destination and the ID transmitted from the terminal apparatus 102 and store the information of the starting position, the destination and the ID in the storage unit 114. At a step S42, the control unit 111 performs route image generation processing.

Figure 14:
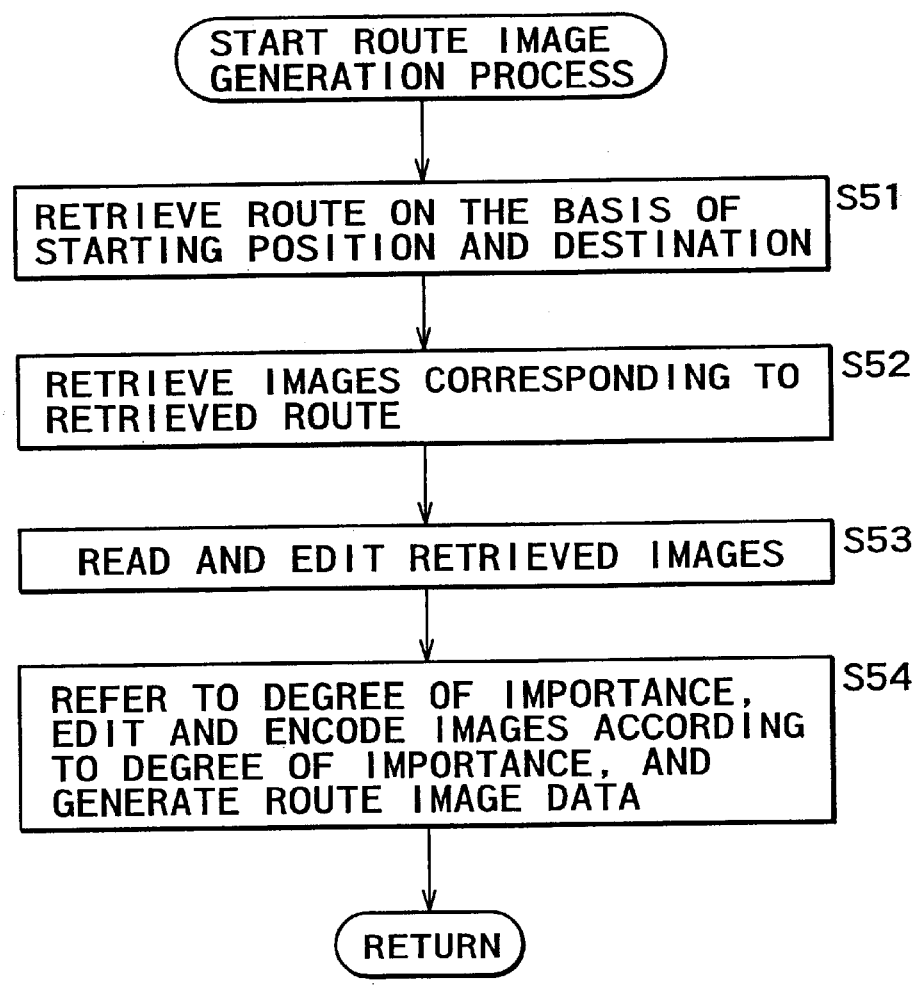
FIG. 14 is a flowchart of assistance in explaining route image generation processing.

The route image generation process will be described in the following with reference to the flowchart of FIG. 14.

At a step S51, the route retrieving unit 116a of the data processing unit 116 retrieves a shortest route on the basis of the information of the starting position and the destination received from the terminal apparatus 102 and the map data stored in the storage unit 114, and then it supplies the shortest route to the data retrieving unit 116b.

At a step S52, the data retrieving unit 116b retrieves moving image data corresponding to the retrieved route from the moving image data stored in the storage unit 114. More specifically, the control unit 111 compares information of positions on the retrieved route with the positional information of the image data stored as shown in FIG. 12, retrieves corresponding moving image data in frame units, and then outputs the moving image data to the data converting unit 116c.

Figure 15:
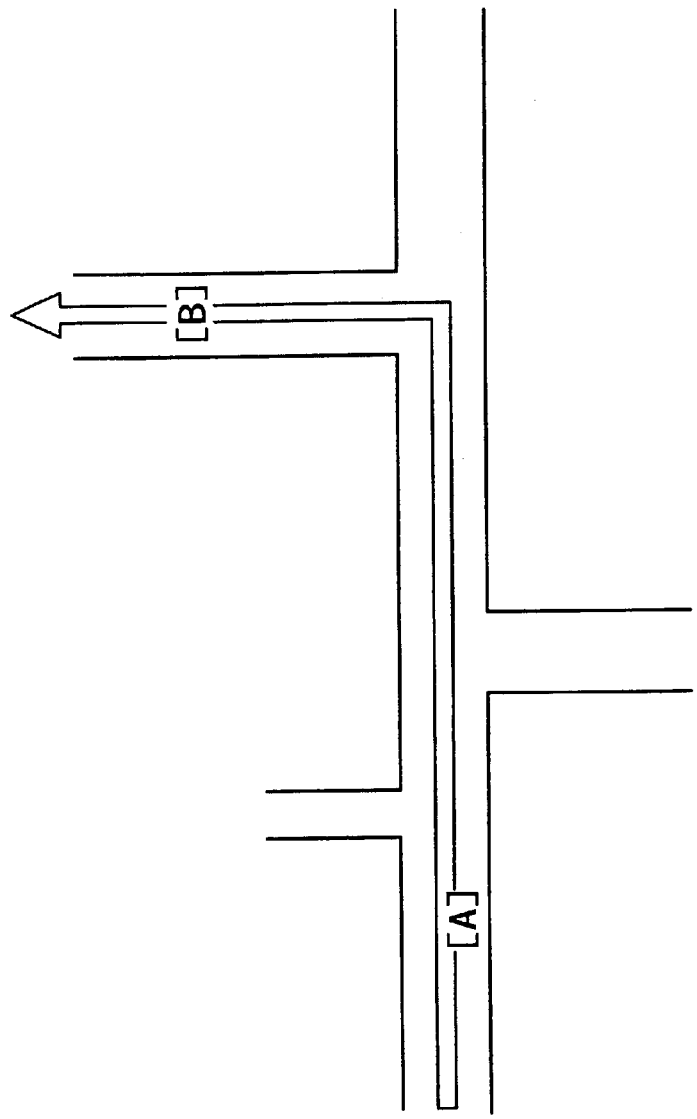
FIG. 15 is a diagram of assistance in explaining route image data.
Figure 16:
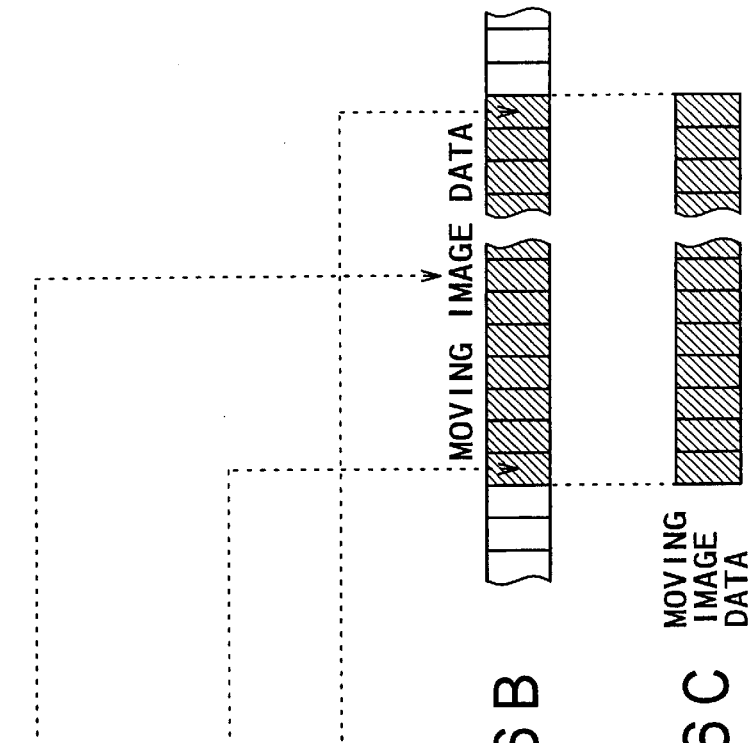
FIGS. 16A, 16B, and 16C are diagrams of assistance in explaining the editing of route image data.

At a step S53, the data converting unit 116c edits the moving image data inputted thereto. More specifically, when a starting position A and a destination B are specified as shown in FIG. 15, for example, and when moving image data including that of a route from the starting position A to the destination B are retrieved from the storage unit 114, the data converting unit 116c performs editing processing so as to extract only necessary moving image data. Of the moving-image data stored in the storage unit 114, the requested moving-image data are, moving image data from an address pA corresponding to the positional information of the starting position A to an address pB corresponding to the positional information of the destination B, as shown in FIGS. 16A and 16B. Accordingly, the data converting unit 116c performs editing processing by extracting only frames of the necessary moving image data, as shown in FIG. 16C, on the basis of the positional information and the address information. This processing makes it possible to remove moving image data of other than the required section and, thus, reduce the amount of moving image data to be transmitted to the terminal apparatus 102.

Figure 17:
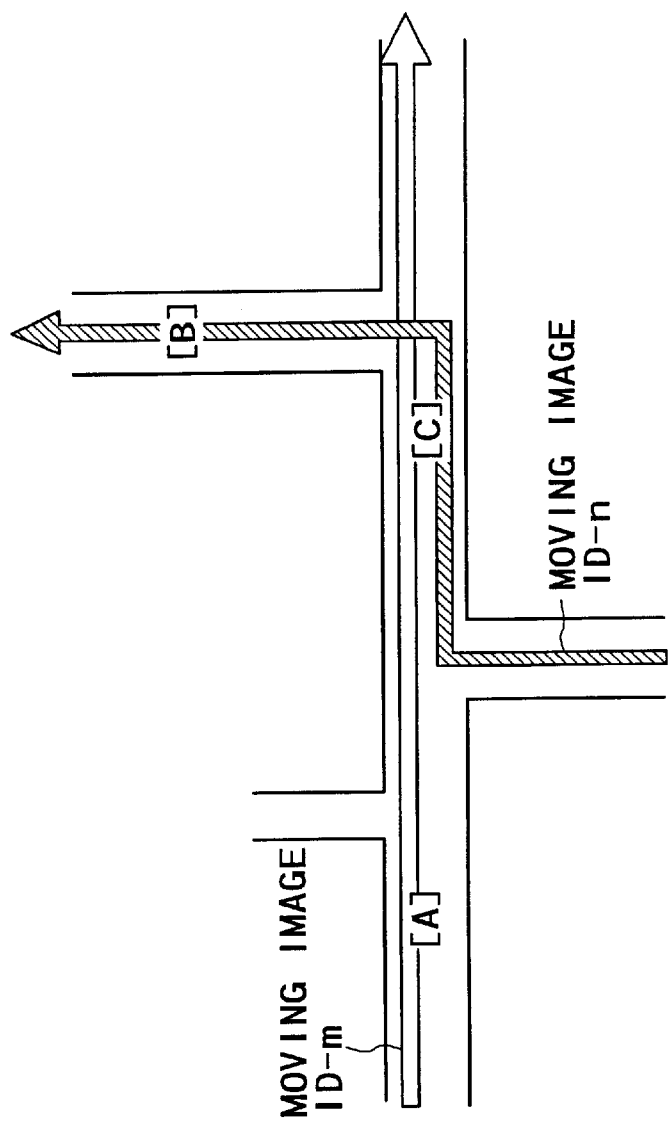
FIG. 17 is a diagram of assistance in explaining the editing of route image data.
Figure 18A:
FIGS. 18A, 18B, and 18C are diagrams of assistance in explaining the editing of route image data.
Figure 18B:
Figure 18C:
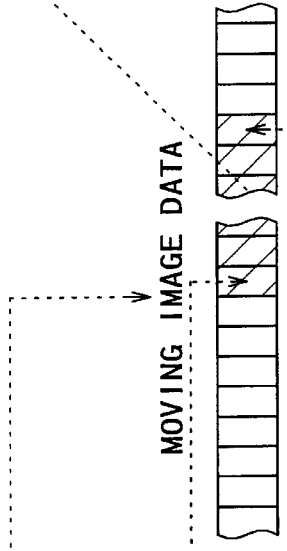

When, as shown in FIG. 17, there no moving image data including that of the section from the starting position A to the destination B and there are moving image data (moving image ID-m) including route image data of a section from the starting position A to a position C between the starting position A and the destination B and route image data (moving image ID-n) including that of a section from the position C to the destination B, the moving image data (moving image ID-m) and the route image data (moving image ID-n) being separated from each other, the image data of the section from the starting position A to the destination B can be generated by performing editing processing so as to extract the moving image data of the separate sections and combine the moving image data, as shown in FIGS. 18A, 18B, and 18C. Specifically, the data converting unit 116c extracts moving image data from an address pA corresponding to the positional information A to an address pC corresponding to the positional information C from the moving image data ID-m, as shown in FIG. 18A, and extracts image data from an address pC' corresponding to the positional information C to an address pB corresponding to the positional information B from the moving image data ID-n, as shown in FIG. 18B. The data converting unit 116c then combines the moving image data as shown in FIG. 18C to thereby generate desired route image data.

This processing makes it possible to generate desired moving image data by combining a plurality of pieces of moving image data with each other, even when there are no moving image data of a required section, and also reduce the amount of image data to be transmitted to the terminal apparatus 102.

It is to be noted that while the above processing has been described by taking an example where the desired moving image data are generated from two pieces of moving image data, the data converting unit 116c may of course extract necessary parts from more than two pieces of image data and combine the parts with each other to thereby generate desired image data.

Returning to the flowchart of FIG. 14, a description will be made of the following.

At a step S54, the encoding unit 112 encodes the image data generated by the route retrieving unit 116a, the data retrieving unit 116b, and the data converting unit 116c of the data processing unit 116 according to the degree of importance, to thereby generate route image data. More specifically, the encoding unit 112 encodes the image data while changing the frame rate according to the degree of importance. For example, as shown in FIGS. 19A and 19B, the degree of importance is low in the section from the position P4 to the position P5 shown in FIGS. 11A and 11B. Hence, the encoding unit 112 reduces the number of frames F1 to F13 in the image data of the section from the position P4 to the position P5, as shown in FIG. 19C to ⅓, for example, as shown in FIG. 19D (extracts one frame from every three frames), and thereby it extracts only frames F1, F4, F7, F10, and F13. The encoding unit 112 removes the other frames F2, F3, F5, F6, F8, F9, F11, and F12. On the other hand, as shown in FIGS. 20A and 20B, the degree of importance is high in the section from the position P5 to the position P6 shown in FIGS. 11A and 11B. Hence, the encoding unit 112 encodes all frames between frame F31 and frame F32 shown in FIG. 20C without thinning out the frames, as shown in FIG. 20D.

Such encoding processing is performed to encode image data, as shown in FIG. 21B edited in correspondence with the route shown in FIG. 21A (corresponding to FIG. 11A) into image data as shown in FIG. 21C, on the basis of the degree of importance, as shown in FIG. 11B. Specifically, frames in the image data of the section from the position P1 to the position P2, the section from the position P3 to the position P4, the section from the position P5 to the position P6, the section from the position P7 to the position P8, the section from the position P9 to the position P10, and the section from the position P11 to the position P12, where the degree of importance is high, are encoded without being thinned out. Frames in the image data of the section from the position P2 to the position P3, the section from the position P4 to the position P5, the section from the position P6 to the position P7, the section from the position P8 to the position P9, and the section from the position P10 to the position P11, where the degree of importance is low, are thinned out to ⅓and then encoded. As a result, it is possible to reduce the amount of data without degrading the information necessary for a route display of the edited moving image data.

Returning to the flowchart of FIG. 13, a description will be made of the following.

After the route image generation processing is performed at the step S42, the control unit 111 at a step S43 controls the authentication billing unit 117 to perform authentication processing on the basis of the ID transmitted from the terminal apparatus 102 and perform billing processing to the billing server 104 via the communication unit 115 and the network 4 for charges for the route image data. Incidentally, the description in the following will be made of a case where no particular problem has occurred in the authentication processing, and the billing processing to the billing server 104 has been performed successfully. However, when there is a problem in the authentication processing and the billing processing has not been performed successfully, the processing is ended.

At a step S44, the control unit 111 controls the communication unit 115 to transmit the generated route-image data to the terminal apparatus 102 via the network 4.

At a step S33, the control unit 135 of the terminal apparatus 102 controls the communication unit 131 to receive the route image data transmitted from the server 101 via the network 4 and then output the route image data to the decoding unit 132. At a step S34, the decoding unit 132 decodes the encoded route image data inputted thereto, and then displays the route image data on the display unit 133. In this case of route images displayed on the display unit 133, an image of a section near a landmark object (such as a signal, an intersection, a building, a corner or the like), as shown in FIG. 20C, has a normal number of frames and is, therefore, reproduced at a normal reproduction speed. Other images of low importance not particularly including much information necessary for the route guidance have a lowered frame rate and are, therefore, displayed as in fast forward.

With the processing described above, when a user is headed for a destination, the user operates the input unit 136 of the terminal apparatus 102 to input the destination, receives image data of a route to the destination from the server 101, and looks at a route image on display. Therefore, the user can efficiently check the route and landmarks on the route in advance. In addition, since the route image data transmitted to the user are encoded with the frame rate of the route image data varied according to the degree of importance, it is possible to reduce the time and the cost required for the communication.

Incidentally, the encoding method in the above example may be any encoding method, such as MPEG (including MPEG1, MPEG2, and MPEG4), Motion Jpeg or the like, as long as the encoding method can compress moving image data. In the case of MPEG, however, moving images need to be reproduced by referring to a previous and a following frame and, thereby, performing prediction processing. Therefore, simply thinning out frames at predetermined intervals, as described with reference to FIGS. 19A to 19D and FIGS. 20A to 20D, may disturb the decoded images. Thus, in the case of MPEG, the thinning-out processing that needs to be performed after a frame, preventing a breakdown of the relation between a previous and a following frame, is generated by, for example, inserting spliced video data, referred to as a repeat picture, as described in U.S. application Ser. No. 09/876,990.

Figure 22:
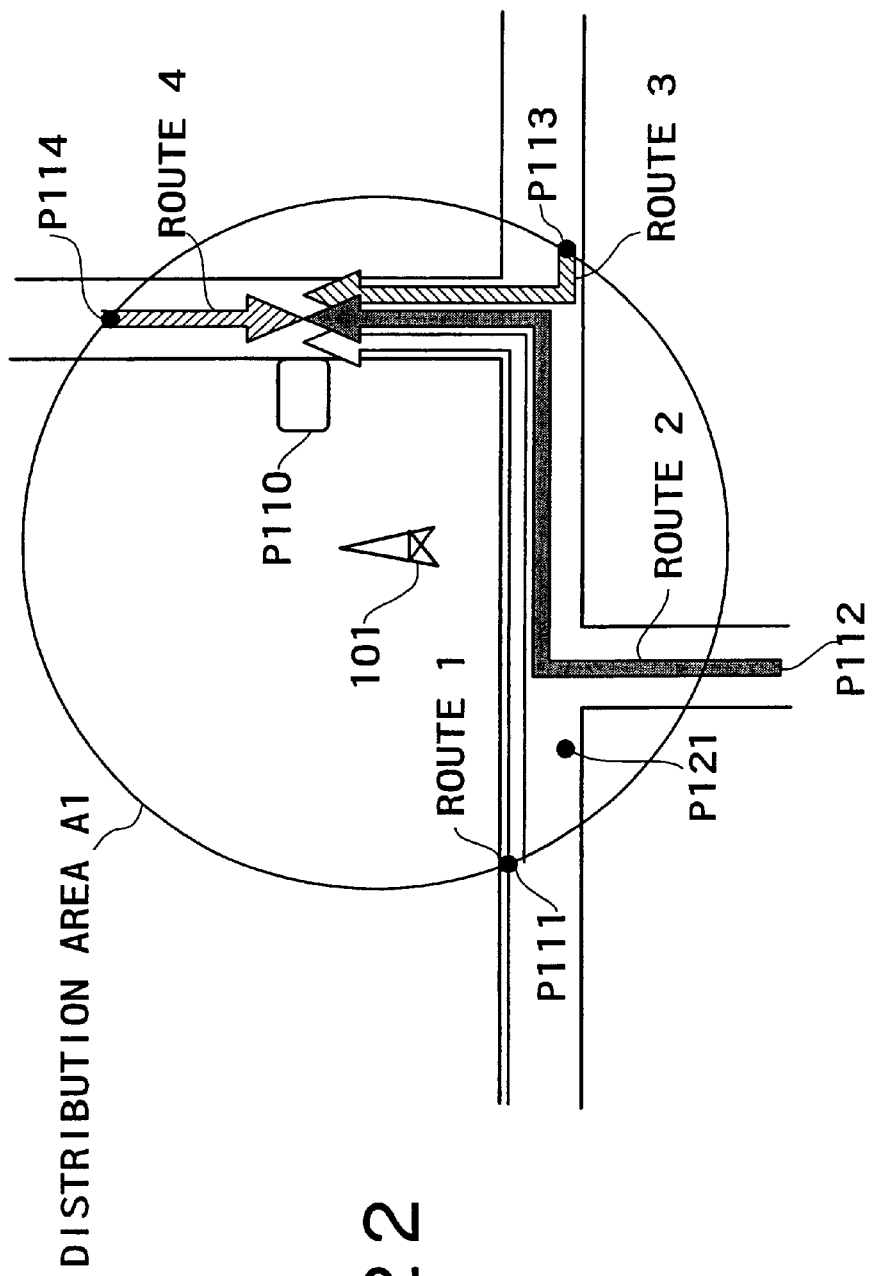
FIG. 22 is a diagram of assistance in explaining the distribution of route image data.

While in the above example, a description has been given of a case where the server 101 and the terminal apparatus 102 perform processing in a one-to-one relation to each other, route image data for a predetermined destination may be multiplexed into a broadcasting program or the like and transmitted (distributed) from a server 101 to a plurality of terminal apparatuses 102 within a distribution area A1 as shown in FIG. 22, for example.

In this case, a terminal apparatus 102 can receive the route image data only when the terminal apparatus 102 is within the distribution area A1. Hence, a total of four routes, that is, a route 1 from a position P111 to a destination P101, a route 2 from a position P112 to the destination P101, a route 3 from a position P113 to the destination P101, and a route 4 from a position P114 to the destination P101 are supposed as the routes to the destination P101. Accordingly, the server 101 synthesizes and distributes four pieces of route image data for the four routes, while the terminal apparatus 102 receives and displays these pieces of route image data.

The configuration of the server 101 for multiplexing route image data into a broadcasting program and, thereby, distributing the route image data to a plurality of terminal apparatuses 102 will now be described with reference to FIG. 23. The server 101 of FIG. 23 is basically of the same configuration as the server 101 of FIG. 5, but it is different from the server 101 of FIG. 5 in that the server 101 of FIG. 23 is newly provided with a video signal encoding unit 141, an audio signal encoding unit 142, a multiplexing unit 143, and a broadcast distributing unit 144.

The video signal encoding unit 141 and the audio signal encoding unit 142 encode, for distribution, a video signal and an audio signal, respectively, inputted for a radio broadcast or a television broadcast and then output the encoded video signal and audio signal to the multiplexing unit 143. The multiplexing unit 143 time division-multiplexes the encoded video signal and audio signal inputted from the video signal encoding unit 141 and the audio signal encoding unit 142 and route image data and then outputs the result to the broadcast distributing unit 144. The broadcast distributing unit 144 is a broadcast signal transmitting device formed by an antenna or the like, and it broadcasts the multiplexed signal inputted from the multiplexing unit 143 as distributed data.

Figure 24:
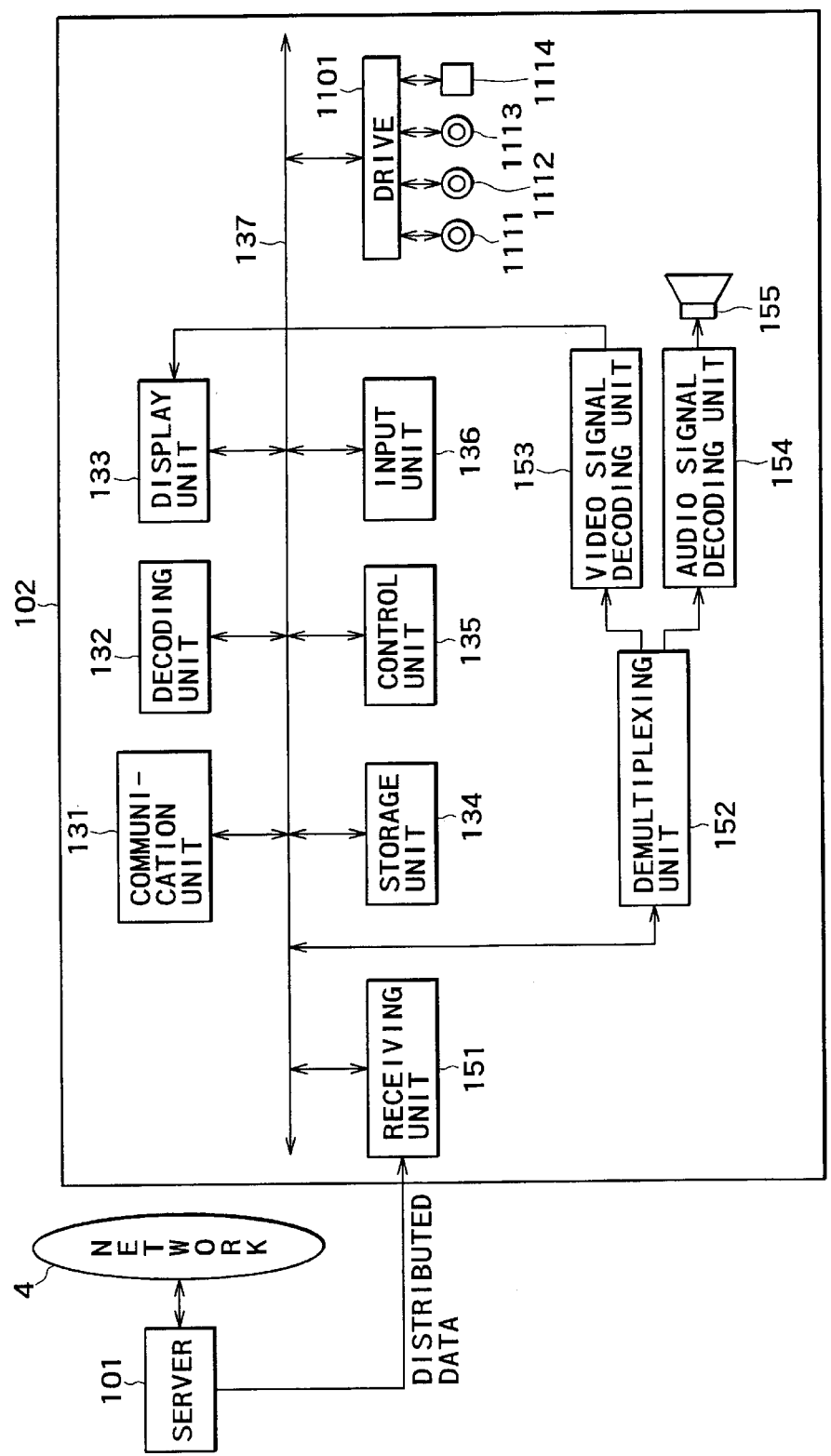
FIG. 24 is a diagram of assistance in explaining a configuration of a terminal apparatus for receiving the distributed route image data.

A terminal apparatus 102 for receiving the broadcast program having the route image data multiplexed therein will next be described with reference to FIG. 24. The terminal apparatus 102 of FIG. 24 is basically of the same configuration as the terminal apparatus of FIG. 6, but it is different from the terminal apparatus of FIG. 6 in that the terminal apparatus 102 of FIG. 24 is provided with a receiving unit 151, a demultiplexing unit 152, a video signal decoding unit 153, an audio signal decoding unit 154, and a speaker 155.

Figure 23:
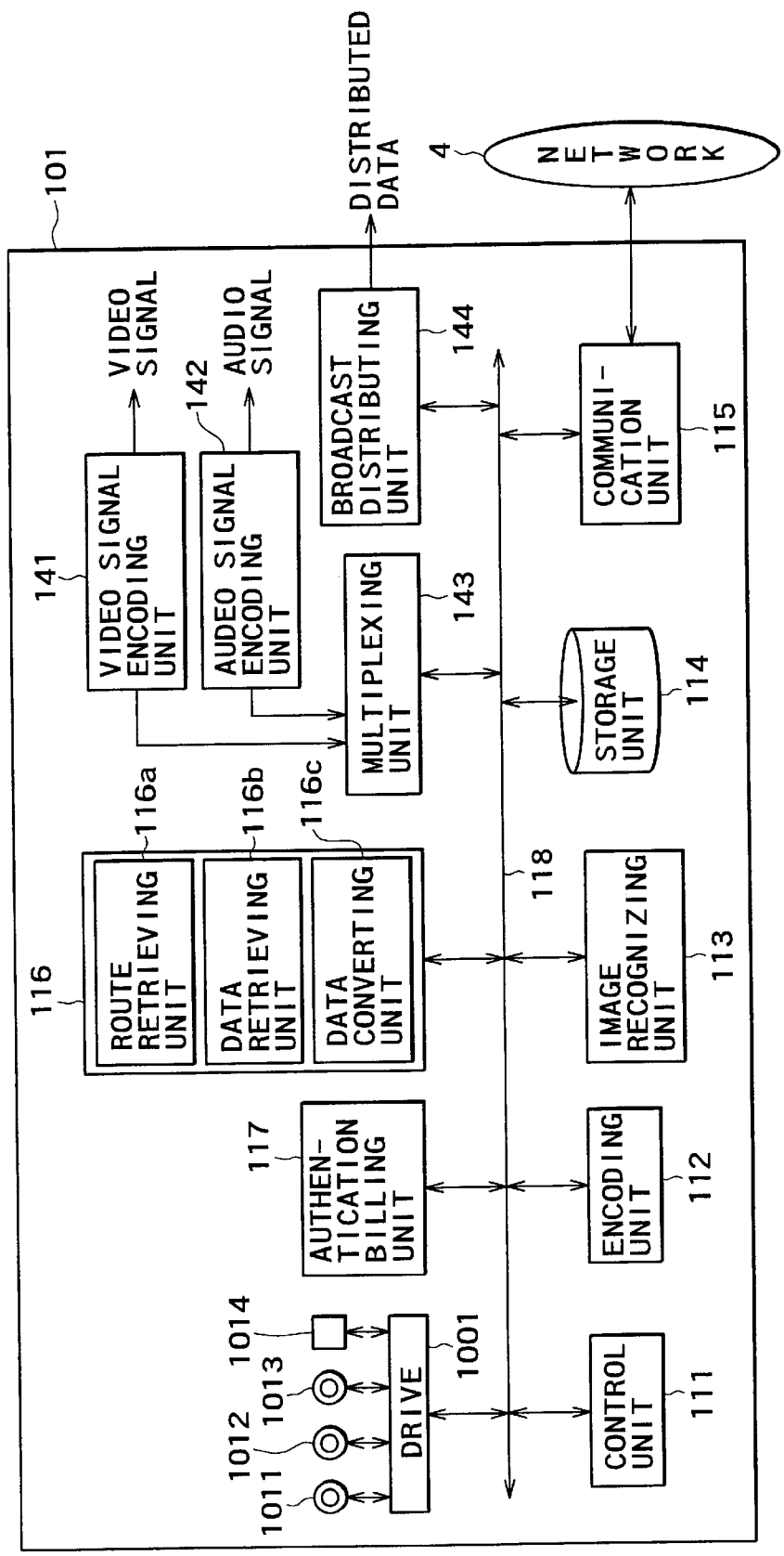
FIG. 23 is a diagram of assistance in explaining a configuration of a server for distributing route image data.

The receiving unit 151 is an antenna for receiving the distributed data broadcast from the broadcast distributing unit 144 of the server 101 of FIG. 23. The demultiplexing unit 152 demultiplexes the video signal, the audio signal, and the route image data that are time-division-multiplexed in the distributed data. The demultiplexing unit 152 then outputs the video signal to the video signal decoding unit 153, the audio signal to the audio signal decoding unit 154, and the route image data to a storage unit 134.

The video signal decoding unit 153 and the audio signal decoding unit 154 decode the encoded video signal and audio signal inputted thereto, respectively. The video signal decoding unit 153 and the audio signal decoding unit 154 then display the video signal on a display unit 133 and output the audio signal to the speaker 155, respectively.

Figure 25:
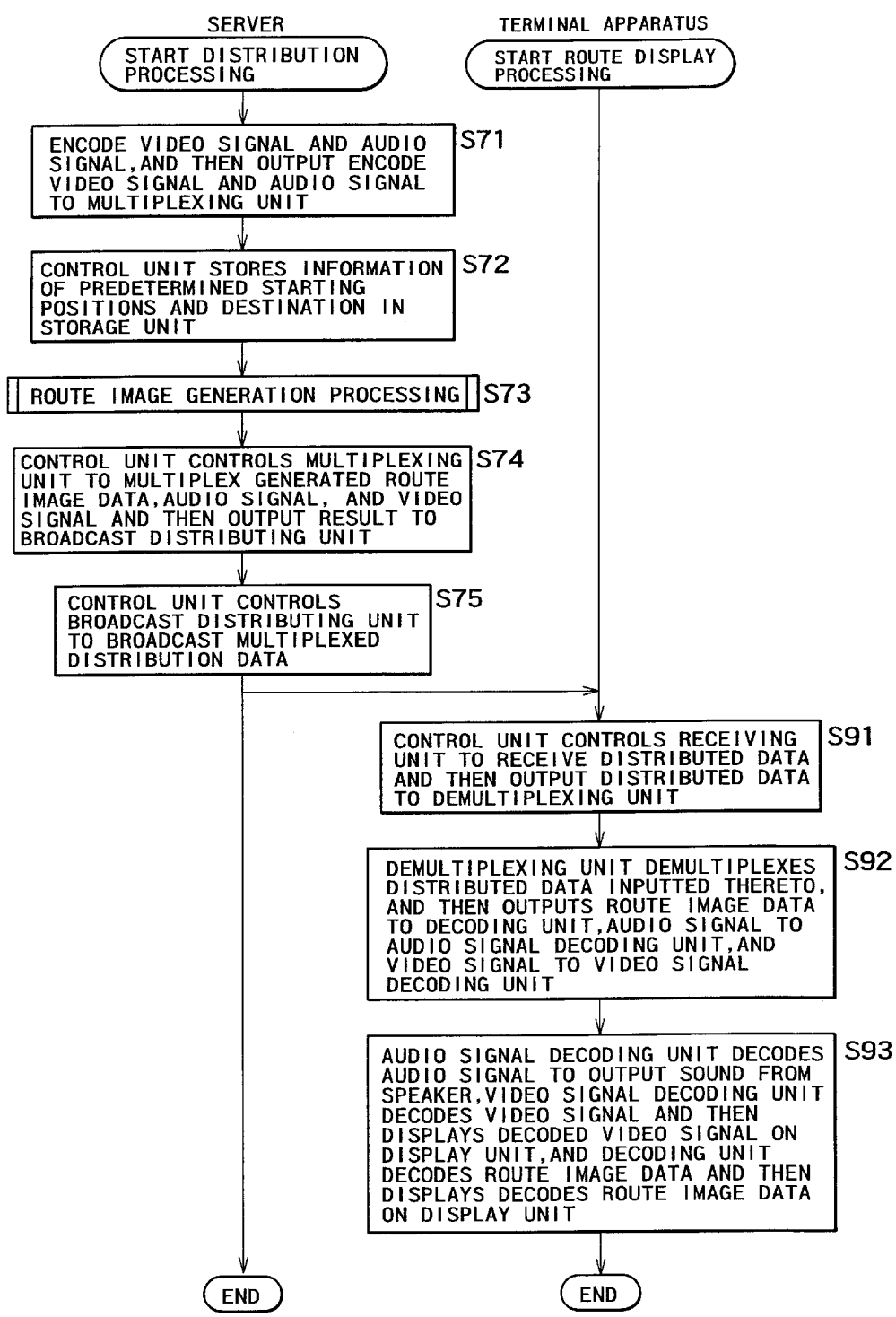
FIG. 25 is a flowchart of assistance in explaining the process of distributing the route image data by the server in FIG. 24 and processing of displaying the distributed route image data by the terminal apparatus in FIG. 24.

Distribution processing of the server 101 and route display processing of the terminal apparatus 102 will next be described with reference to the flowchart of FIG. 25.

At a step S71, the video signal encoding unit 141 and the audio signal encoding unit 142 of the server 101 encode a video signal and an audio signal, respectively, inputted thereto for a radio broadcast or a television broadcast and then output the encoded video signal and audio signal to the multiplexing unit 143.

At a step S72, the control unit 111 stores information of predetermined starting positions and a predetermined destination in a storage unit 114. At a step S73, the control unit 111 performs route image generation processing. The route image generation processing is the same as the processing of the flowchart of FIG. 14, and, therefore description, a of the route image generation processing will be omitted. In this case, route image data is generated for each of the routes 1 to 4 shown in FIG. 22. At a step S74, the control unit 111 controls the multiplexing unit 143 to multiplex the generated route image data and the encoded video signal and audio signal and then output the result to the broadcast distributing unit 144. At a step S75, the control unit 111 controls the broadcast distributing unit 144 to broadcast the distribution data multiplexed by the multiplexing unit 143.

At a step S91, the control unit 135 of the terminal apparatus 102 controls the receiving unit 151 to receive the distributed data and then output the distributed data to the demultiplexing unit 152. At a step S92, the demultiplexing unit 152 demultiplexes the distributed data inputted thereto. The demultiplexing unit 152 then outputs the route image data to the storage unit 134, the video signal to the video signal decoding unit 153, and the audio signal to the audio signal decoding unit 154.

At a step S93, the video signal decoding unit 153 decodes the video signal and then outputs the decoded video signal to the display unit 133, the audio signal decoding unit 154 decodes the audio signal to output sound from the speaker 155, and the decoding unit 132 decodes the route image data stored in the storage unit 134 and then outputs the decoded route image data to the display unit 133.

Specifically, when the terminal apparatus 102 is located at a position P121 in FIG. 22, for example, the terminal apparatus 102 receives the route image data of the routes 1 to 4 multiplexed in the distributed data distributed from the server 101. In this state, the user operates the input unit 136 to select the route image data of route 1 and display the route image data of route 1 on the display unit 133.

Also, necessary route image data in the distributed data may be selectively decoded by providing the terminal apparatus 102 with a GPS receiver or the like and, thereby, enabling measurement of the position of the user. Specifically, in the case of FIG. 22, it is shown by a position measuring device, such as the GPS receiver, that the terminal apparatus 102 is located at the position P121. It, therefore, suffices to decode the route image data of the route 1. Accordingly, only the route image data of route 1 in the distributed data may be decoded, and the route image data of the other routes 2 to 4 may be excluded from the decoding processing.

In addition, in the above example, the display unit 133 is supplied with the route image data decoded by the decoding unit 132 and the video signal decoded by the video signal decoding unit 153. The display unit 133 may be set to display two screens for a simultaneous display of images of both the route image data and the video signal, or it may be set to display either one of the screens by a signal from the input unit 136.

Furthermore, since the same route image generation processing at steps S72 and S73 is repeated for the routes 1 to 4 in the distribution area A1, the route image data may be generated and stored in the storage unit 114 in advance, to be used repeatedly.

With such processing, when, for example, a program advertising a store is broadcast and image data of a route to the store is multiplexed into the advertising program and then transmitted, a user interested in the advertisement can display the image data of the route to the store to know the route to the store. Therefore, a user who is interested in the advertisement but has not bothered to check the location of the store by himself/herself to go to the store can readily obtain the image of the route to the store and check the route to the store. It is, thus, possible to further enhance the effects of the advertisement of the store.

While a description has been made so far of the example where the server 101 stores image data on the basis of image data generated by a data generating apparatus 2 and generates route image data from the stored image data and distributes the route image data to the terminal apparatus 102, the data generating apparatus 2 may be configured so as to generate route image data and transmit the route image data directly to the terminal apparatus 102.

Thus, a configuration of a data generating apparatus 201 and a terminal apparatus 202 when the data generating apparatus 201 generating route image data transmits the route image data directly to the terminal apparatus 202 for display will be described with reference to FIG. 26 and FIG. 27.

The data generating apparatus 201 has an image pickup unit 211, an image recognizing unit 212, an encoding unit 213, a storage unit 214, a communication unit 215, a gyro 216, a GPS receiver 217, a vehicle operation sensor 218, a control unit 219, and a drive 1201, which are connected to a bus 220. Of these parts, the image pickup unit 211, the image recognizing unit 212, the encoding unit 213, the storage unit 214, the communication unit 215, the gyro 216, the GPS receiver 217, the control unit 219, and the drive 1201 of the data generating apparatus 201 correspond to and have the same functions as the image pickup unit 31 provided to the data generating apparatus 2 of FIG. 2, the image recognizing unit 113, the encoding unit 112, the storage unit 114, and the communication unit 115 provided to the server 101 of FIG. 5, the gyro 31a and the GPS receiver 32 provided to the data generating apparatus 2 of FIG. 2, and the control unit 111 and the drive 1001 provided to the server 101 of FIG. 5, respectively. Therefore, a description of the functions of the parts will be omitted. The vehicle operation sensor 218, newly provided to the data generating apparatus 201, for example, detects the steering angle or the like of a steering wheel or the like for operating a vehicle, such as a motor vehicle, and it obtains the traveled distance from an accelerometer or the like to thereby obtain the traveled distance and traveling speed of the vehicle, such as a motor vehicle. Hence, each of the gyro 216, the GPS receiver 217, and the vehicle operation sensor 218 is a device intended to detect a position, and information of a position where image data is generated is obtained by using information from one of the devices or information from the devices in combination.

The terminal apparatus 202 has a communication unit 231, a decoding unit 232, a display unit 233, a storage unit 234, a control unit 235, an input unit 236, a GPS receiver 237, and a drive 1301, which are each connected to a bus 238. The communication unit 231, the decoding unit 232, the display unit 233, the storage unit 234, the control unit 235, the input unit 236, the GPS receiver 237, and the drive 1301 correspond to and have the same functions as the communication unit 131, the decoding unit 132, the display unit 133, the storage unit 134, the control unit 135, and the input unit 136 of the terminal apparatus 102 of FIG. 6, the GPS receiver 217 in FIG. 26, and the drive 1101 in FIG. 6, respectively. Therefore, a description of the functions of the parts will be omitted.

When route image data are directly transmitted from the data generating apparatus 201 to the terminal apparatus 202, the server 101 issues an instruction as to which of a plurality of data generating apparatuses 201 is to transmit the route image data to a predetermined terminal apparatus 202, and the server 101 performs billing processing. Thus, the predetermined terminal apparatus 202 makes a request to the server 101 for route image data, the server 101 retrieves a route and performs billing processing in response to the request, and thereafter the server 101 instructs a nearby data generating apparatus 201 on the retrieved route to transmit route image data to the predetermined terminal apparatus 202.

Route image display processing when the data generating apparatus 201 transmits the route image data to the terminal apparatus 202 will next be described with reference to the flowchart of FIG. 28.

At a step S101, the input unit 236 of the terminal apparatus 202 is operated by a user to input a starting position and a destination. Of course, the starting position may be a starting position corresponding to positional information obtained from information received by the GPS receiver 237. At a step S102, the control unit 235 controls the communication unit 231 to transmit the information of the starting position and the destination as well as ID information of the terminal apparatus 202 itself, to the server 101.

At a step S111, the control unit 111 of the server 101 controls the communication unit 115 to store the information of the starting position, the destination and the ID information transmitted from the terminal apparatus 202 in the storage unit 114. At a step S112, the control unit 111 controls the authentication billing unit 117 to perform billing processing for charges for route image data. At a step S113, the control unit 111 retrieves a route while referring to map data on the basis of the starting position and the destination stored in the storage unit 114, and then it instructs a data generating apparatus 201 on the retrieved route to transmit route image data to the terminal apparatus 202 corresponding to the ID stored in the storage unit 114.

At a step S121, the control unit 219 of the data generating apparatus 201 controls the communication unit 215 to receive the instruction transmitted from the server 101. At a step S122, the image pickup unit 211 stores picked-up image data in the storage unit 214. At a step S123, the control unit 219 obtains positional information from the gyro 216, the GPS receiver 217, and the vehicle sensor 218 and stores the positional information in the storage unit 214.

At a step S124, the control unit 219 of the data generating apparatus 201 performs the process of calculating the degree of importance. This processing is the same as the processing described with reference to the flowchart of FIG. 9, and, therefore, a description of the processing will be omitted.

At a step S125, the control unit 219 controls the encoding unit 213 to refer to the degree of importance, encode moving image data in such a manner as to correspond to the degree of importance, and thereby generate route image data. At a step S126, the control unit 219 controls the communication unit 215 to transmit the generated route image data to the terminal apparatus 202 corresponding to the ID.

The encoding of image data in such a manner as to correspond to the degree of importance means that in a case where the degree of importance is set as shown in FIG. 11B, for example, since the section from the position P4 to the position P5 shown in FIG. 29A has a low degree of importance, as shown in FIG. 29B, data of the section is encoded by extracting one frame from every three frames, as shown in FIG. 29C. Specifically, as shown in FIG. 29C, frames F51, F54, F57, F60, and F63 are extracted, and other frames F52, F53, F55, F56, F58, F59, F61, and F62 are removed by thinning-out processing. On the other hand, the section from the position P5 to the position P6 shown in FIG. 30A has a high degree of importance, as shown in FIG. 30B, and, therefore, all frames of encoding data of the section are extracted, as shown in FIG. 30C. Specifically, as shown in FIG. 30C, all frames from frame F71 to frame F72 are extracted and encoded.

At a step S103, the control unit 235 of the terminal apparatus 202 controls the communication unit 231 to receive the route image data transmitted from the data generating apparatus 201 and then output the route image data to the decoding unit 232. The decoding unit 232 decodes the received encoded data and then displays the decoded data on the display unit 233.

Such processing allows route image data to be transmitted directly from the data generating apparatus 201 to the terminal apparatus 202. In addition, by changing the frame rate according to the degree of importance, it is possible to increase the communication speed and reduce the communication cost. Furthermore, since transmission at a low bit rate is possible, route image data can be transferred even in conditions of congested communication on the network.

While in the example described above, the data generating apparatus 201 transmits picked-up images in real time, the data generating apparatus 201 may, for example, store image data picked up in advance in the storage unit 214 and transmit the stored image data to the terminal apparatus 202.

Figure 28:
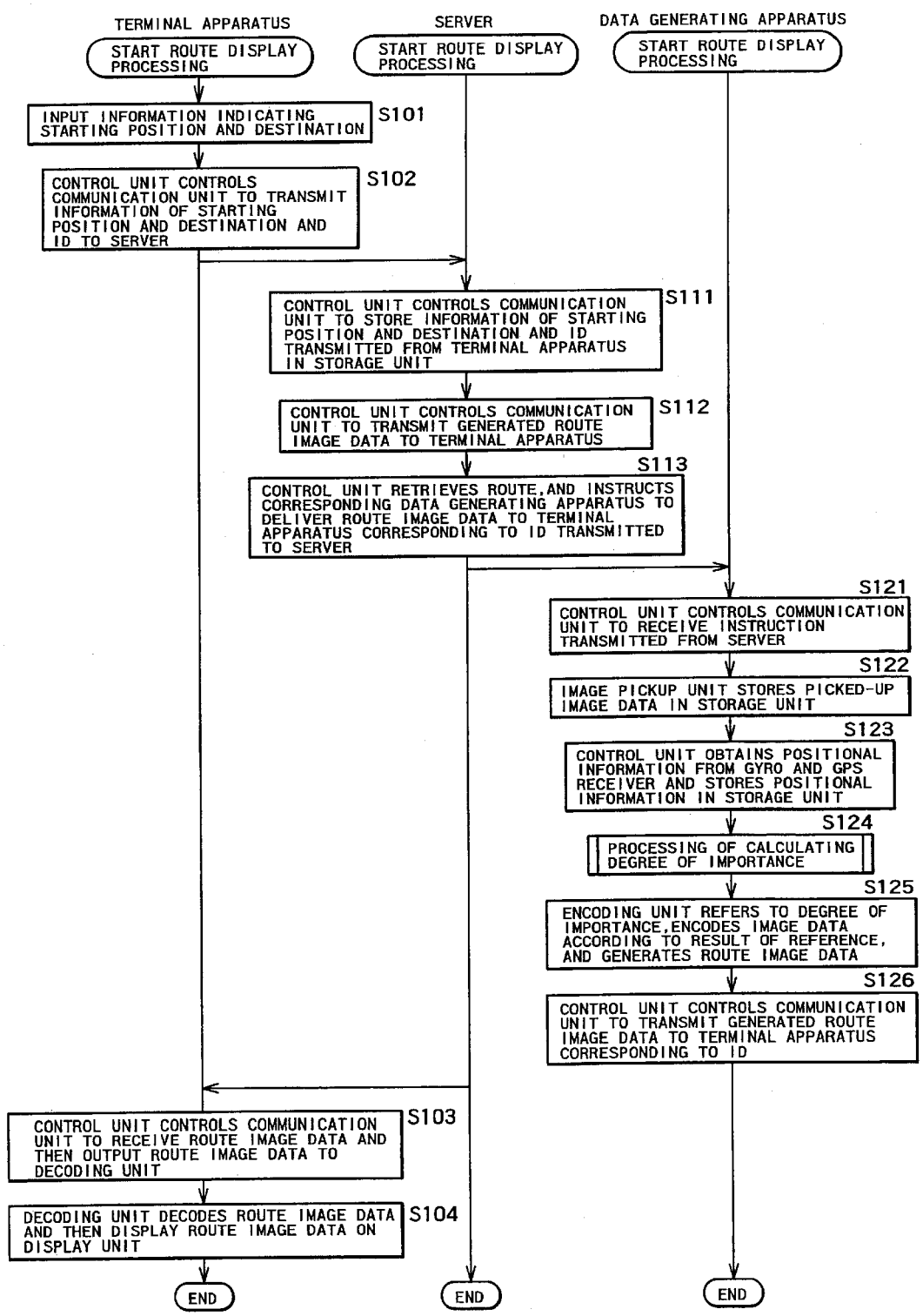
FIG. 28 is a flowchart of assistance in explaining the process for delivering the route-image data by the server in FIG. 27 and the process of displaying the delivered route image data by the terminal apparatus in FIG. 27.

While in the example described above, the frame rate of the route image data is changed according to the degree of importance in encoding processing by the encoding unit 213, the frame rate may be changed when the image data picked up by the image pickup unit 211 are stored in the storage unit 214 at step S122 in the flowchart of FIG. 28, for example. In this case, the degree of importance calculation process at step S124 needs to be performed before the picked-up image data are stored.

Figure 31A:
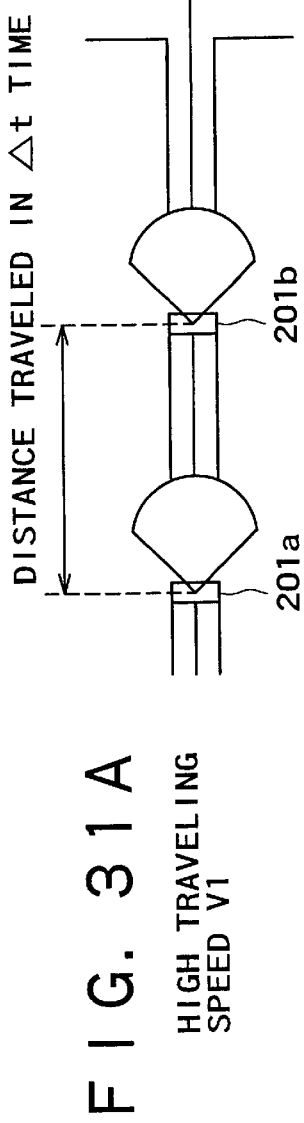
FIGS. 31A and 31B are diagrams of assistance in explaining the encoding of route image data according to the traveling speed of the data generating apparatus.

Also, the frame rate of the image data picked up by the image pickup unit 211 may be changed by obtaining the traveling speed from information of the positions or the like measured by the vehicle operation sensor 218 of the data generating apparatus 201. Specifically, when the data generating apparatus 201 travels at a traveling speed v1, as shown in FIG. 31A, a field of view Va picked up by a image pickup unit 211 of a data generating apparatus 201a is moved by a distance D1 in a traveling time Δt, and then a field of view Vb of a data generating apparatus 201b is picked up.

Figure 31B:
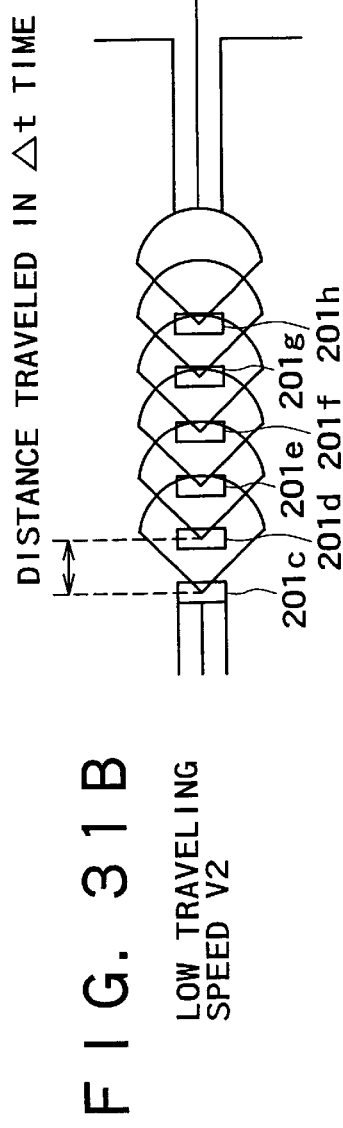
Figure 32:
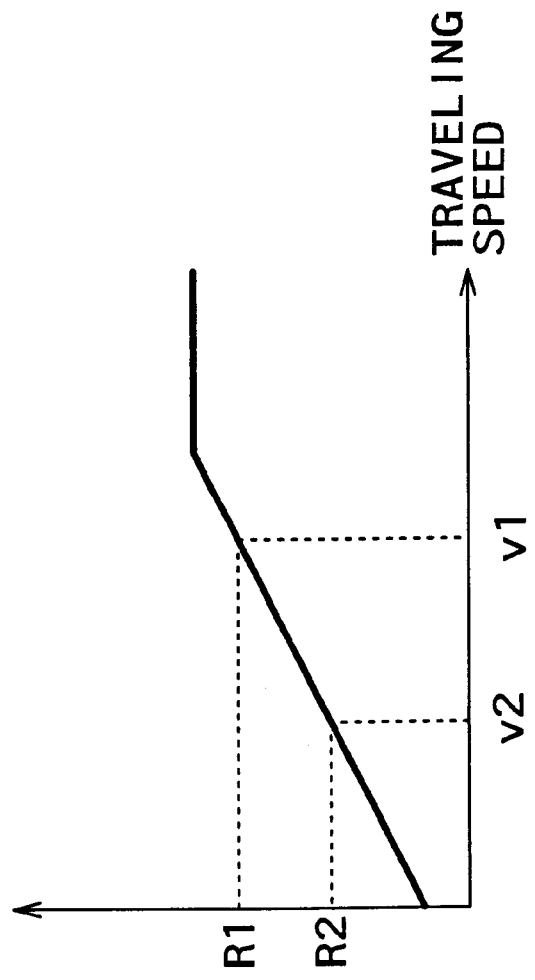
FIG. 32 is a diagram of assistance in explaining the encoding of route image data according to the traveling speed of the data generating apparatus.

When a data generating apparatus 201c travels at a traveling speed v2 (for example, v2=(v1)/6), as shown in FIG. 31B, the data generating apparatus 201c is moved by only a distance D2 (for example, D2=(D1)/6) in the traveling time Δt, resulting in only a movement from a field of view Vc of the data generating apparatus 201c to a field of view Vd of a data generating apparatus 201d. Thus, before the data generating apparatus 201c is moved by the distance D1, a field of view Ve of a data generating apparatus 201e is picked up in a traveling time 2Δt; a field of view Vf of a data generating apparatus 201f is picked up in a traveling time 3Δt; a field of view Vg of a data generating apparatus 201g is picked up in a traveling time 4Δt; and a field of view Vh of a data generating apparatus 201h is picked up in a traveling time 5Δt. As a result, the lower the speed, the more redundancy of the picked-up image data. Thus, by changing the frame rate according to the traveling speed as shown in FIG. 32, it is possible to reduce the redundancy of the image data and the frame rate. Specifically, supposing that the frame rate is R1 when the data generating apparatus 201 has a traveling speed of vi and the traveling speed is lowered to v2, the frame rate can be decreased from R1 to R2 in proportion to the traveling speed.

The process of changing the frame rate so as to correspond to the degree of importance or so as to correspond to the traveling speed, as described above, may be performed by the terminal apparatus 202. In this case, the information of the degree of importance or the traveling speed of the data generating apparatus 201 is transmitted to the terminal apparatus 202 together with the route image data. In this case, the decoding unit 232 of the terminal apparatus 202 may perform decoding process while performing the processing of changing the frame rate so as to correspond to the degree of importance or so as to correspond to the traveling speed, or the terminal apparatus 202 may change the frame rate when the display unit 233 displays the route image data.

Moreover, while the example described above has dealt with route image data, not only image data but also other data, for example, audio data and text data, may be transferred. In the case of audio data, particularly music data, a portion where the singing voice of a singer is recorded may be set to a high degree of importance (converted at a high bit rate), and a portion of an interlude may be set to a low degree of importance (converted at a low bit rate), for example. In the case of text data, for example, a paper, sections of an abstract and a conclusion may be set to a high degree of importance, and other sections may be set to a low degree of importance.

While in the example described above, the method for compressing moving image data changes the frame rate, the method for compressing moving image data is not limited to this; for example, the method for compressing moving image data may change the image frame, change the encoding method, or re-encode the moving image data while changing the bit rate or frame rate after decoding the moving image data.

In the billing processing described above, charges for distribution of route image data are paid from an account specified by the user or the like or paid by subtracting points. When the user owns both the data generating apparatus 201 and the terminal apparatus 202 or owns an apparatus having the data generating apparatus 201 and the terminal apparatus 202 integrated therein, for example, and when image data picked up by the data generating apparatus 201 are transmitted (uploaded) to the server 101, the charges for route image data may be cancelled out by value for the image data transmitted from the data generating apparatus 201.

As described above, since the terminal apparatus 202 also can reduce route image data, the terminal apparatus 202 can reduce the amount of route image data while receiving or displaying the route image data transmitted from the data generating apparatus 201, thus resulting in better communication cost, communication speed and display speed. In addition, since it suffices only to distribute the same route image data, the processing of generating the route image data can be simplified.

The series of processing steps described above can be carried out not only by hardware but also by software. When the series of processing steps is to be carried out by software, a program forming the software is installed from a recording medium onto a computer that is incorporated in special hardware or a general-purpose personal computer that can perform various functions by installing various programs thereon, for example.

Figure 6:
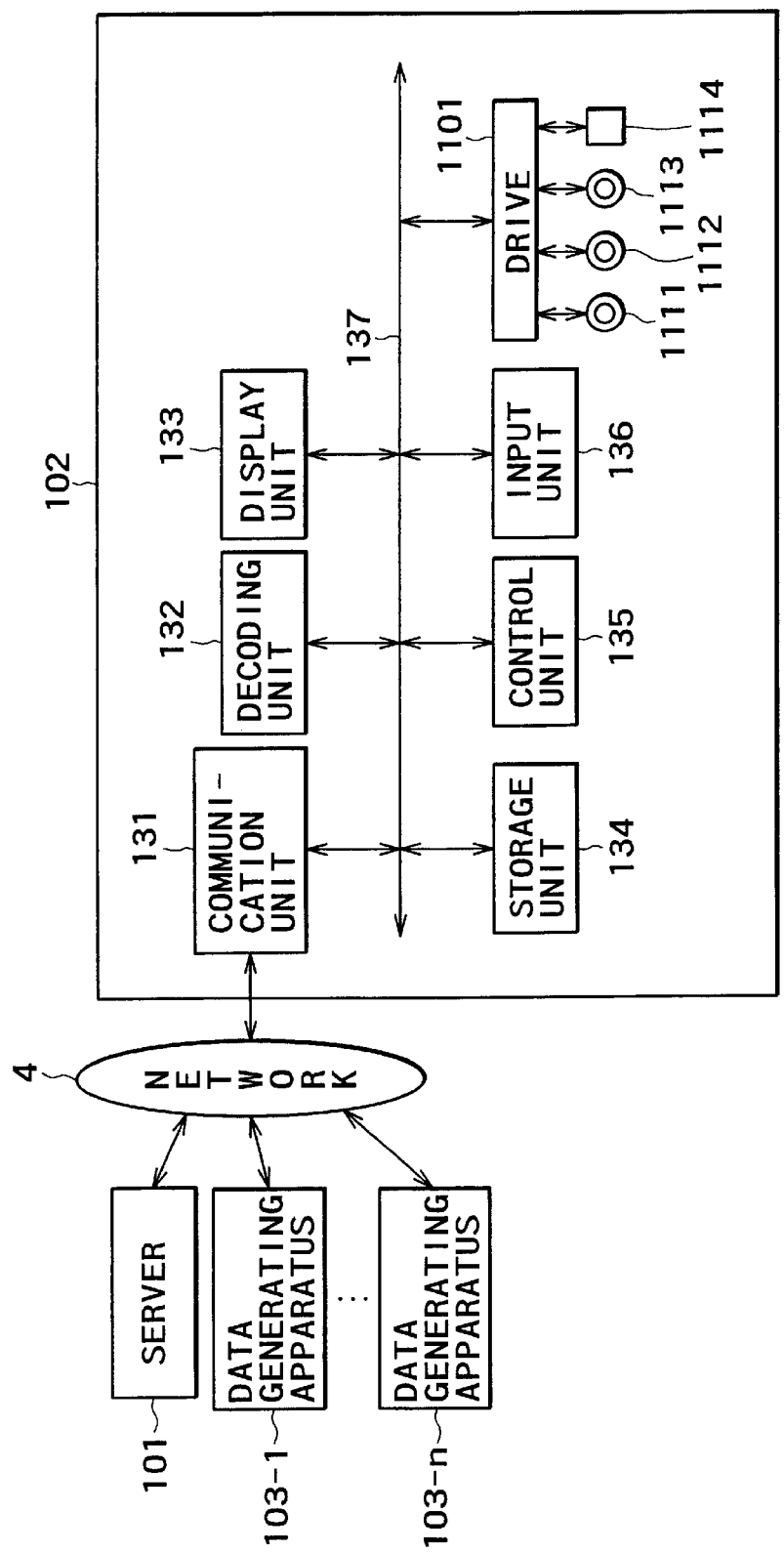
FIG. 6 is a diagram of assistance in explaining a configuration of a terminal apparatus to which the present invention is applied.
Figure 26:
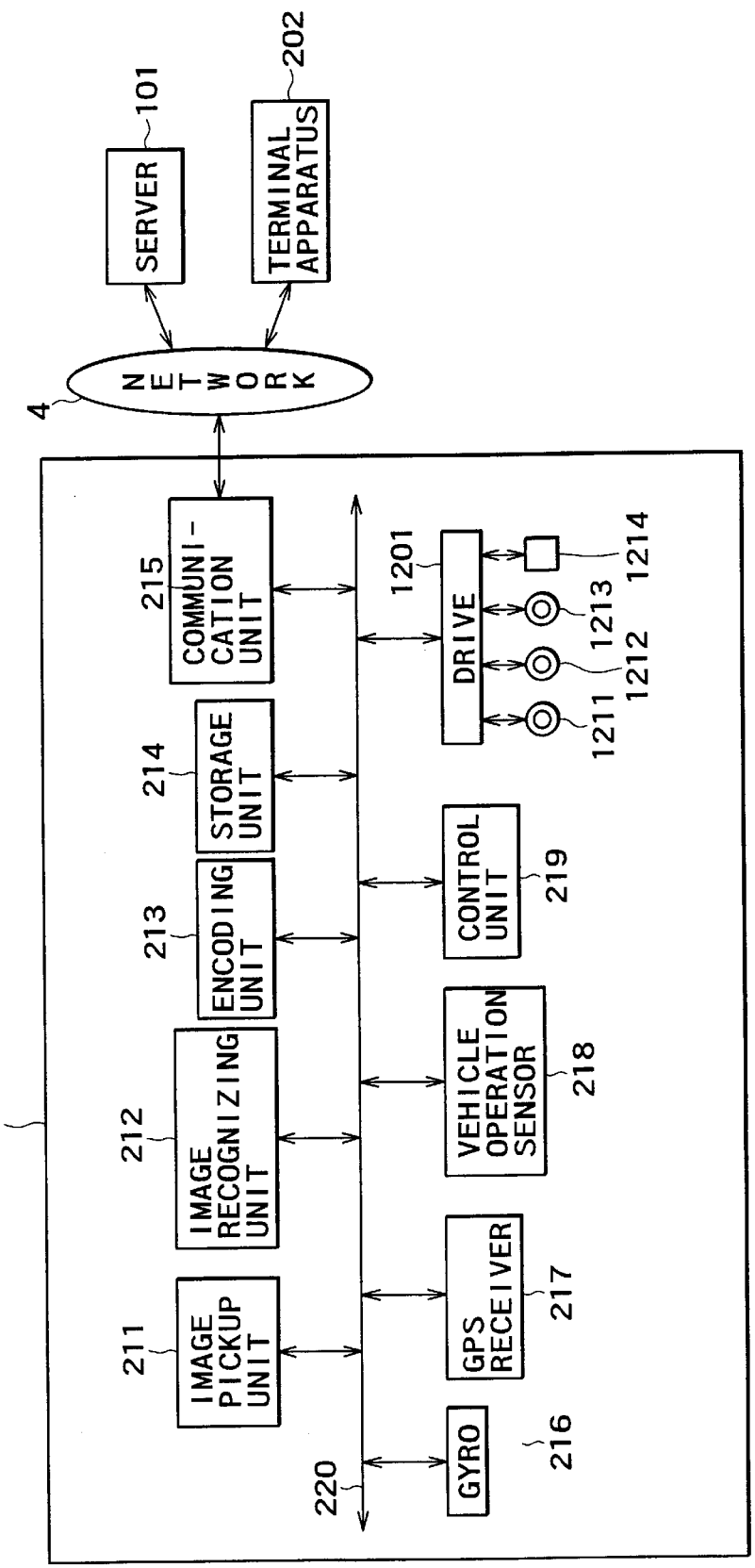
FIG. 26 is a diagram of assistance in explaining a configuration of another data generating apparatus for transmitting route image data.
Figure 27:
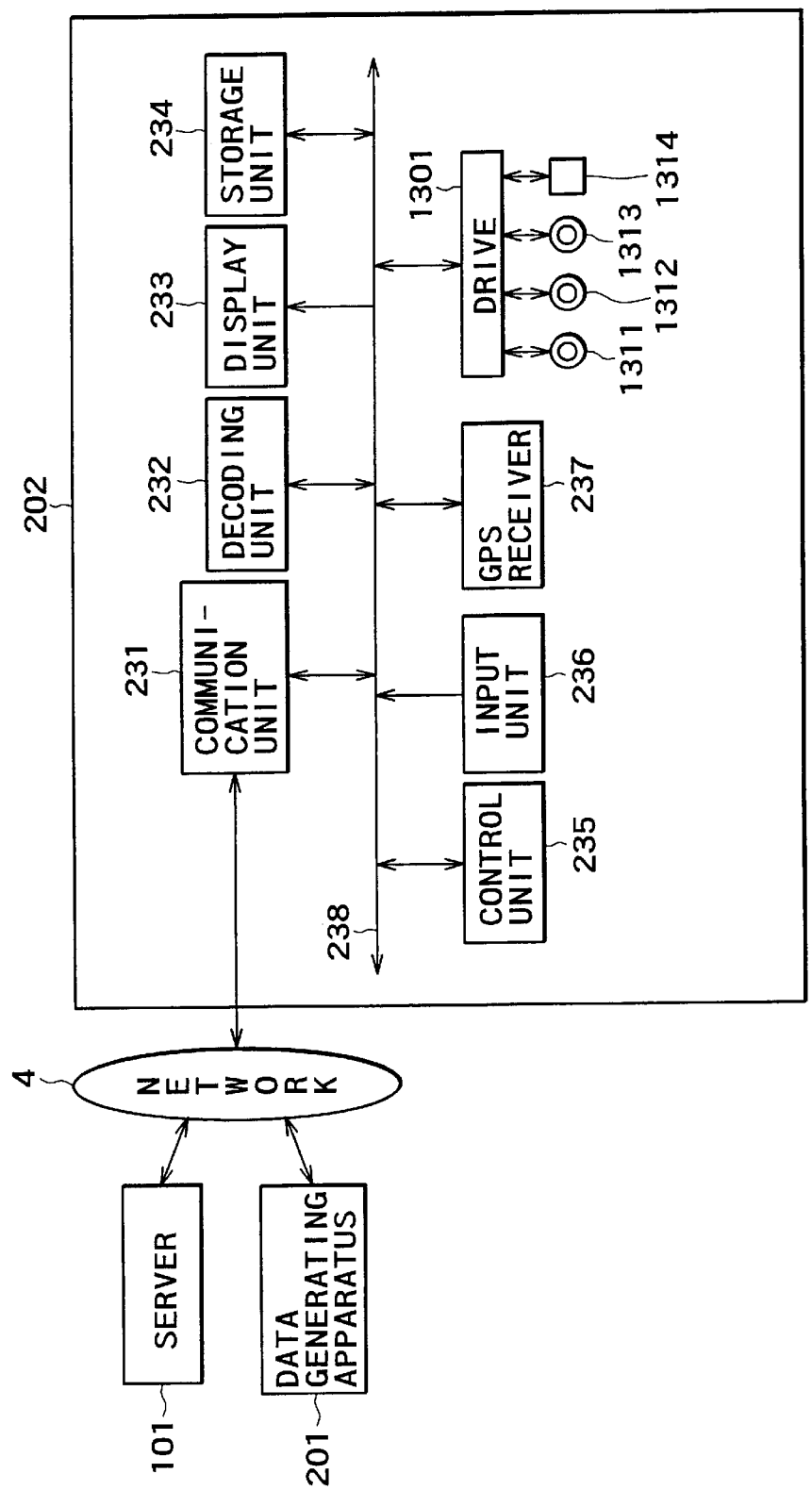
FIG. 27 is a diagram of assistance in explaining a configuration of a terminal apparatus for receiving the route image data transmitted from the data generating apparatus in FIG. 26.

The recording medium is not only formed by the storage units 114, 134, 214, and 234 that h have the program recorded thereon and are provided to the user in a state of being preincorporated in the servers 101 shown in FIG. 5 and FIG. 23, the terminal apparatus 102 shown in FIG. 6 and FIG. 24, the data generating apparatus 201 shown in FIG. 26, and the terminal apparatus 202 shown in FIG. 27, for example, but also it is formed by packaged media distributed to users to provide the program separately from the computer, the packaged media being formed by the magnetic disks 1011, 1111, 1211, and 1311 (including flexible disks), the optical disks 1012, 1112, 1212, and 1312 (including CD-ROM (Compact Disk-Read Only Memory) and DVD (Digital Versatile Disk)), the magneto-optical disks 1013, 1113, 1213, and 1313 (including MD (Mini-Disc) (trademark)), the semiconductor memories 1014, 1114, 1214, and 1314 (including Memory Stick) or the like having the program recorded thereon.

It is to be noted that in the present specification, the steps describing the program recorded on the recording medium include not only processing carried out in time series in the described order but also processing carried out in parallel or individually and not necessarily in time series.

While the preferred embodiments of the present invention have been described using the specific terms, such description is for illustrative purposes only, and it is to be understood that changes and variations may be made without departing from the spirit or scope of the following claims.

What is claimed is:

1. An information processing apparatus comprising:
moving image data storing means for storing moving image data;
degree of importance setting means for setting a degree of importance of said moving image data;
thinning-out means for thinning out said moving image data on the basis of said degree of importance and thereby generating thinned-out data; and
transmitting means for transmitting said thinned-out data to another information processing apparatus.

2. An information processing apparatus as claimed in claim 1, further including:

map data storing means for storing map data; and traveling route retrieving means for retrieving a traveling route from a specified starting position to a specified destination on the basis of said map data;

wherein said degree of importance setting means sets the degree of importance of said moving image data corresponding to said traveling route.

3. An information processing apparatus as claimed in claim 2, wherein said moving image data storing means stores a plurality of pieces of said moving image data;

said plurality of pieces of said moving image data include moving image data picked up when image pickup routes from different starting positions to different destinations are traveled;

said information processing apparatus further includes:

selecting means for selecting said moving image data of said image pickup routes including said traveling route from said plurality of pieces of said moving image data; and extracting means for extracting portions of said moving image data selected by said selecting means, said portions corresponding to said traveling route from said specified starting position to said specified destination;

said degree of importance setting means sets the degree of importance of said extracted moving image data; and said thinning-out means thins out said extracted moving image data on the basis of said degree of importance and thereby generates thinned-out data.

4. An information processing apparatus as claimed in claim 2, wherein said degree of importance setting means sets high the degree of importance of said moving image data of a section near a main point on said traveling route.

5. An information processing apparatus as claimed in claim 4, wherein said main point includes a starting point, an ending point, a signal, a sign, an access to and an exit from an expressway, an intersection, a main building, or a station on said traveling route.

6. An information processing apparatus as claimed in claim 2, further including:

broadcast signal generating means for generating a television broadcast signal or a radio broadcast signal;

multiplexing means for multiplexing said television broadcast signal or said radio broadcast signal and said thinned-out data and thereby generating distributing data; and distributing means for distributing said distributing data to a plurality of said other information processing apparatuses.

7. An information processing apparatus as claimed in claim 1, wherein when the moving image data is encoded data encoded using a predictive relation between a temporally preceding frame and a temporally succeeding frame, said thinning-out means thins out a frame that does not affect the predictive relation between said frames of said moving image data, and thereby generates thinned-out data.

8. An information processing apparatus as claimed in claim 1, wherein, on the basis of said degree of importance, said thinning-out means lowers a thinning-out rate as said degree of importance is raised, and thereby generates said thinned-out data.

9. An information processing apparatus as claimed in claim 1, further including:

ID receiving means for receiving ID information of a user of said other information processing apparatus together with a request for delivery of said thinned-out data, which request is transmitted from said other information processing apparatus;

user identifying means for identifying said user from the ID information received by said ID receiving means; and billing means for billing said user identified by said identifying means for charges for transmission of said thinned-out data.

10. An information processing method comprising:

a moving image data storing step for storing moving image data;

a degree of importance setting step for setting a degree of importance of said moving image data;

a thinning-out step for thinning out said moving image data on the basis of said degree of importance and thereby generating thinned-out data; and a transmitting step for transmitting said thinned-out data to another information processing apparatus.

11. An information processing apparatus comprising:

moving image data recording means for recording moving image data;

degree of importance setting means for setting a degree of importance of said moving image data;

storing means for storing said moving image data and said degree of importance; and transmitting means for transmitting said moving image data and said degree of importance to another information processing apparatus.

12. An information processing apparatus as claimed in claim 11, wherein said moving image data is moving image data for a guiding route, and said degree of importance is the degree of importance on said guiding route.

13. An information processing apparatus as claimed in claim 12, wherein said degree of importance setting means sets high the degree of importance of said moving image data of a section near a main point on said guiding route.

14. An information processing apparatus as claimed in claim 13, wherein said main point includes a starting point, an ending point, a signal, a sign, an access to and an exit from an expressway, an intersection, a main building, or a station on said guiding route.

15. An information processing apparatus as claimed in claim 12, further including positional information obtaining means for obtaining positional information, wherein said degree of importance setting means sets the degree of importance of said moving image data for said guiding route on the basis of said positional information.

16. An information processing apparatus as claimed in claim 15, wherein said positional information obtaining means includes a gyro, a vehicle operation sensor, or a GPS.

17. An information processing apparatus as claimed in claim 12, further including characteristic quantity obtaining means for obtaining a characteristic quantity of said moving image data, wherein said degree of importance setting means sets the degree of importance of said moving image data for said guiding route on the basis of the characteristic quantity of said moving image data.

18. An information processing apparatus as claimed in claim 12, further including thinning-out means for thinning out said moving image data on the basis of said degree of importance and thereby generating thinned-out data, wherein said transmitting means transmits said thinned-out data to said other information processing apparatus.

19. An information processing apparatus as claimed in claim 18, wherein said thinning-out means thins out said moving image data by changing a frame rate of said moving image data on the basis of said degree of importance, and thereby generates said thinned-out data.

20. An information processing apparatus as claimed in claim 18, further including traveling speed measuring means for measuring a traveling speed of said information processing apparatus itself, wherein said thinning-out means thins out said moving image data by changing a frame rate of said moving image data according to said traveling speed as well as said degree of importance, and thereby generates said thinned-out data.

21. An information processing method comprising:

a moving image data recording step for recording moving image data;

a degree of importance setting step for setting a degree of importance of said moving image data;

a storing step for storing said moving image data and said degree of importance; and a transmitting step for transmitting said moving image data and said degree of importance to another information processing apparatus.

22. An information processing apparatus comprising:

moving image data receiving means for receiving moving image data transmitted from another information processing apparatus;

degree of importance setting means for setting a degree of importance of said moving image data; and reproducing means for reproducing said moving image data on the basis of said degree of importance.

23. An information processing apparatus as claimed in claim 22, wherein said moving image data is moving image data for a guiding route, and said degree of importance is the degree of importance on said guiding route.

24. An information processing apparatus as claimed in claim 23, wherein said degree of importance setting means sets high the degree of importance of said moving image data of a section near a main point on said guiding route.

25. An information processing apparatus as claimed in claim 24, wherein said main point includes a starting point, an ending point, a signal, a sign, an access to and an exit from an expressway, an intersection, a main building, or a station on said guiding route.

26. An information processing apparatus as claimed in claim 23, wherein said moving image data receiving means receives positional information corresponding to said moving image data as well as said moving image data transmitted from said other information processing apparatus; and said degree of importance setting means sets the degree of importance of said moving image data for said guiding route on the basis of said positional information.

27. An information processing apparatus as claimed in claim 23, wherein said reproducing means reproduces said moving image data while thinning out said moving image data on the basis of said degree of importance.

28. An information processing method comprising:

a moving image data receiving step for receiving moving image data transmitted from another information processing apparatus;

a degree of importance setting step for setting a degree of importance of said moving image data; and a reproducing step for reproducing said moving image data on the basis of said degree of importance.

29. A recording medium having a computer readable program recorded thereon, said program including:

a moving image data receiving control step for controlling receiving of moving image data transmitted from another information processing apparatus;

a degree of importance setting control step for is a controlling setting of a degree of importance of said moving image data; and a reproducing control step for controlling reproduction of said moving image data on the basis of said degree of importance.

* * * * *

UNITED STATES PATENT AND TRADEMARK OFFICE
CERTIFICATE OF CORRECTION

PATENT NO. : 6,694,251 B2
DATED : February 17, 2004
INVENTOR(S) : Shinji Negishi It is certified that error appears in the above-identified patent and that said Letters Patent is hereby corrected as shown below:

Column 24,
Line 43, "is a" should be deleted.

Signed and Sealed this

Tenth Day of August, 2004

JON W. DUDAS
*Acting Director of the United States Patent and Trademark Office*